United States Patent
Zhang et al.

(10) Patent No.: US 10,916,951 B2
(45) Date of Patent: Feb. 9, 2021

(54) DEVICE TO BE CHARGED AND CHARGING METHOD

(71) Applicant: GUANGDONG OPPO MOBILE TELECOMMUNICATIONS CORP., LTD., Dongguan (CN)

(72) Inventors: Jialiang Zhang, Dongguan (CN); Chen Tian, Dongguan (CN); Jun Zhang, Dongguan (CN); Shebiao Chen, Dongguan (CN); Shiming Wan, Dongguan (CN); Jiada Li, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/701,264

(22) Filed: Dec. 3, 2019

(65) Prior Publication Data

US 2020/0106276 A1 Apr. 2, 2020

Related U.S. Application Data

(63) Continuation of application No. 15/565,512, filed as application No. PCT/CN2017/074825 on Feb. 24,
(Continued)

(51) Int. Cl.
*H02J 7/00* (2006.01)
*H02J 7/04* (2006.01)
*H01M 10/44* (2006.01)

(52) U.S. Cl.
CPC ......... *H02J 7/0019* (2013.01); *H01M 10/441* (2013.01); *H02J 7/008* (2013.01);
(Continued)

(58) Field of Classification Search
CPC .... H02J 7/0019; H02J 7/00302; H02J 7/0029; H02J 7/00036; H02J 2207/40;
(Continued)

(56) References Cited

U.S. PATENT DOCUMENTS 5,200,685 A * 4/1993 Sakamoto ............... G06F 1/263
307/66
5,254,931 A * 10/1993 Martensson ............ H02J 7/008
320/114
(Continued)

FOREIGN PATENT DOCUMENTS

CN 101022179 A 8/2007
CN 101409455 A 4/2009
(Continued)

OTHER PUBLICATIONS

Korean Patent Application No. 10-2017-7031391 Office Action dated Feb. 11, 2020, 8 pages.
(Continued)

*Primary Examiner* — M Baye Diao
(74) *Attorney, Agent, or Firm* — Lathrop GPM LLP

(57) ABSTRACT

The present disclosure provides a device to be charged and a charging method. The device to be charged includes: a charging interface; a first charging circuit, coupled with the charging interface, configured to receive an output voltage and an output current of an adapter via the charging interface and to directly apply the output voltage and the output current of the adapter to both ends of a plurality of battery cells coupled in series in the device to be charged, so as to perform a direct charging on the plurality of battery cells. With the present disclosure, heat generated in the charging process can be reduced while ensuring the charging speed.

19 Claims, 8 Drawing Sheets

Related U.S. Application Data 2017, now Pat. No. 10,536,006, which is a continuation-in-part of application No. PCT/CN2017/073653, filed on Feb. 15, 2017, which is a continuation-in-part of application No. PCT/CN2016/101944, filed on Oct. 12, 2016.

(52) U.S. Cl.
CPC .......... *H02J 7/0014* (2013.01); *H02J 7/0016* (2013.01); *H02J 7/0024* (2013.01); *H02J 7/0029* (2013.01); *H02J 7/0031* (2013.01); *H02J 7/00036* (2020.01); *H02J 7/0068* (2013.01); *H02J 7/00302* (2020.01); *H02J 7/00712* (2020.01); *H02J 7/00714* (2020.01); *H02J 7/045* (2013.01); *H02J 7/00034* (2020.01); *H02J 2207/40* (2020.01)

(58) Field of Classification Search
CPC ........ H02J 7/045; H02J 7/0016; H02J 7/0024; H02J 7/0031; H02J 7/0068; H02J 7/008; H02J 7/0026; H02J 7/0014; H02J 7/00034; H02J 7/0091; H02J 7/0077; H02J 7/00; H01M 10/441; H02M 3/005
USPC ......................................................... 320/118
See application file for complete search history.

(56) References Cited

U.S. PATENT DOCUMENTS

| | | | | |
|---|---|---|---|---|
| 5,444,867 | A * | 8/1995 | Marui ................... | H02J 7/0068 455/573 |
| 5,465,039 | A * | 11/1995 | Narita ................... | H02J 7/0068 320/164 |
| 5,532,524 | A * | 7/1996 | Townsley ................... | G06F 1/26 307/64 |
| 5,592,064 | A * | 1/1997 | Morita ................... | H01M 2/105 320/110 |
| 5,598,567 | A * | 1/1997 | Ninomiya ............... | G06F 1/305 323/318 |
| 8,129,952 | B2 | 3/2012 | Lee | |
| 8,947,048 | B2 * | 2/2015 | Roessler ............... | H02J 7/0016 320/103 |
| 9,859,742 | B2 * | 1/2018 | Zhang ...................... | H02J 7/085 |
| 10,110,028 | B2 * | 10/2018 | Zhang ....................... | H02J 7/00 |
| 10,193,368 | B2 * | 1/2019 | Zhang ....................... | H02J 7/00 |
| 10,291,043 | B2 * | 5/2019 | Zhang ...................... | H02J 7/022 |
| 2004/0135544 | A1 * | 7/2004 | King ........................ | B60L 53/11 320/116 |
| 2006/0119319 | A1 | 6/2006 | Sakurai et al. | |
| 2009/0027013 | A1 | 1/2009 | Odaohhara | |
| 2010/0123433 | A1 | 5/2010 | Guo | |
| 2011/0193525 | A1 | 8/2011 | Ro | |
| 2011/0227537 | A1 * | 9/2011 | Maleus ................. | H02J 7/1423 320/116 |
| 2012/0112705 | A1 * | 5/2012 | Wang ........................ | H02J 7/00 320/152 |
| 2012/0119694 | A1 | 5/2012 | Carpenter et al. | |
| 2013/0148382 | A1 | 6/2013 | Rosenblad | |
| 2016/0064962 | A1 | 3/2016 | Huang et al. | |
| 2016/0111898 | A1 | 4/2016 | Luo et al. | |
| 2016/0252553 | A1 * | 9/2016 | Goma ...................... | H02J 7/025 324/652 |
| 2017/0040810 | A1 | 2/2017 | Hu et al. | |

FOREIGN PATENT DOCUMENTS

| | | |
|---|---|---|
| CN | 103094939 A | 5/2013 |
| CN | 103219769 A | 7/2013 |
| CN | 103441542 A | 12/2013 |
| CN | 103762690 A | 4/2014 |
| CN | 103762702 A | 4/2014 |
| CN | 104022542 A | 9/2014 |
| CN | 104167780 A | 11/2014 |
| CN | 104810875 A | 7/2015 |
| CN | 104810877 A | 7/2015 |
| CN | 204668976 U | 9/2015 |
| CN | 105098900 A | 11/2015 |
| CN | 103762702 B | 12/2015 |
| CN | 105162206 A | 12/2015 |
| CN | 105375597 A | 3/2016 |
| CN | 105471001 A | 4/2016 |
| CN | 105896670 A | 8/2016 |
| EP | 2538519 A2 | 12/2012 |
| EP | 2879266 A1 | 6/2015 |
| JP | H10256983 A | 9/1998 |
| JP | 2010124682 A | 6/2010 |
| JP | 2011004509 A | 1/2011 |
| JP | 2012249410 A | 12/2012 |
| JP | 2015100236 A | 5/2015 |
| JP | 2016073066 A | 5/2016 |
| JP | 2017507636 A | 3/2017 |
| TW | 201136094 A | 10/2011 |
| TW | 201136101 A | 10/2011 |
| TW | 201232992 A | 8/2012 |
| TW | 201325014 A | 6/2013 |
| TW | 201403997 A | 1/2014 |
| TW | I479774 B | 4/2015 |
| TW | 201534021 A | 9/2015 |
| TW | 201535928 A | 9/2015 |
| TW | 201535930 A | 9/2015 |
| TW | 201539935 A | 10/2015 |
| TW | M518824 U | 3/2016 |
| TW | 201622290 A | 6/2016 |
| WO | WO 2003088447 A1 | 10/2003 |
| WO | WO-2015147503 A1 * | 10/2015 ............ H02J 7/0036 |
| WO | WO 2015185452 A1 | 12/2015 |
| WO | WO 2016074391 A1 | 5/2016 |
| WO | WO 2016074458 A1 | 5/2016 |

OTHER PUBLICATIONS

Korean Patent Application No. 10-2017-7031391 English translation of Office Action dated Feb. 11, 2020, 7 pages.
Chinese Patent Application No. 201780001071.5 Office Action dated Dec. 30, 2019, 11 pages.
Chinese Patent Application No. 201780001071.5 English translation of Office Action dated Dec. 30, 2019, 12 pages.
Taiwan Patent Application No. 106124422 Office Action dated May 4, 2018, 19 pages.
Taiwan Patent Application No. 106124422 Office Action dated May 4, 2018, 16 pages.
Taiwan Patent Application No. 106424383 Office Action dated Jan. 23, 2018, 3 pages.
Taiwan Patent Application No. 106424383 English translation of Office Action dated Jan. 23, 2018, 3 pages.
Taiwan Patent Application No. 106124046 Office Action dated Mar. 5, 2018, 6 pages.
Taiwan Patent Application No. 106124046 English translation of Office Action dated Mar. 5, 2018, 6 pages.
Taiwan Patent Application No. 106124338 Office Action dated May 4, 2018, 20 pages.
Taiwan Patent Application No. 106124338 English translation of Office Action dated May 4, 2018, 16 pages.
PCT/CN2017/073653 International Search Report and Written Opinion dated Jun. 5, 2017, 12 pages.
PCT/CN2017/073653 English translation of International Search Report and Written Opinion dated Jun. 5, 2017, 6 pages.
PCT/CN2016/101944 International Search Report and Written Opinion dated Jul. 18, 2017, 12 pages.
PCT/CN2016/101944 English translation of International Search Report and Written Opinion dated Jul. 18, 2017, 6 pages.
PCT/CN2017/074825 International Search Report and Written Opinion dated Sep. 26, 2017, 10 pages.
European Patent Application No. 17751226.6 extended Search and Opinion dated Aug. 27, 2019, 10 pages.
European Patent Application No. 17793560.8 extended Search and Opinion dated Jun. 6, 2018, 10 pages.

(56) References Cited

OTHER PUBLICATIONS

Chinese Patent Application No. 201780001071.5 Office Action dated Sep. 10, 2019, 9 pages.
Chinese Patent Application No. 201780001071.5 English translation of Office Action dated Sep. 10, 2019, 15 pages.
Japanese Patent Application 2017-557166 Office Action dated Sep. 25, 2018, 6 pages.
Japanese Patent Application 2017-557166 English translation of Office Action dated Sep. 25, 2018, 6 pages.
Japanese Patent Application 2017-557166 Office Action dated Dec. 18, 2018, 4 pages.
Japanese Patent Application 2017-557166 English translation of Office Action dated Dec. 18, 2018, 4 pages.
U.S. Appl. No. 15/565,512 Office Action dated Jul. 16, 2019, 12 pages.
U.S. Appl. No. 15/565,512 Notice of Allowance dated Sep. 25, 2019, 6 pages.
Indian Patent Application No. 201737033985 Office Action dated Oct. 17, 2019, 5 pages.
Singapore Patent Application No. 11201801125Y Office Action dated Jun. 14, 2018, 7 pages.
European Patent Application No. 17751226.6 Office Action dated Apr. 28, 2020, 4 pages.

\* cited by examiner

DEVICE TO BE CHARGED AND CHARGING METHOD

CROSS REFERENCE TO RELATED APPLICATIONS

This application is a continuation application of U.S. application Ser. No. 15/565,512 filed Oct. 10, 2017, which is a US national phase application of International Application No. PCT/CN2017/074825, filed on Feb. 24, 2017, which claims priority to International Application No. PCT/CN2016/101944, filed on Oct. 12, 2016, and International Application No. PCT/CN2017/073653, filed on Feb. 15, 2017. The entire contents of each of the above applications are incorporated herein by reference.

TECHNICAL FIELD

The present disclosure generally relates to a charging technical field, and more particularly, to a device to be charged and a charging method.

BACKGROUND

Nowadays, mobile terminals such as smart phones are increasingly favored by consumers. However, the mobile terminal consumes large power energy, and needs to be charged frequently.

One feasible solution for improving a charging speed is to adopt a large current to charge a device to be charged. The larger the charging current, the faster the charging speed of the device to be charged. However, the heating problem of the device to be charged becomes serious accordingly.

Thus, under the premise of ensuring the charging speed, how to reduce the heat generated in the device to be charged is an urgent problem to be resolved.

SUMMARY

The present disclosure provides a device to be charged and a charging method, which may reduce the heat generated in the device to be charged under the premise of ensuring the charging speed.

Embodiments of the present disclosure provide a device to be charged. The device to be charged includes: a charging interface; a first charging circuit, coupled with the charging interface, configured to receive an output voltage and an output current of an adapter via the charging interface and to directly apply the output voltage and the output current of the adapter to both ends of a plurality of battery cells coupled in series in the device to be charged, so as to perform a direct charging on the plurality of battery cells.

Embodiments of the present disclosure provide a charging method. The charging method is applied for charging a device to be charged. The device to be charged includes a charging interface. The charging method includes: receiving an output voltage and an output current of an adapter via the charging interface; directly applying the output voltage and the output current of the adapter to both ends of a plurality of battery cells coupled in series in the device to be charged, so as to perform a direct charging on the plurality of battery cells; and equalizing voltages of respective battery cells of the plurality of battery cells.

DETAILED DESCRIPTION

Figure 1:
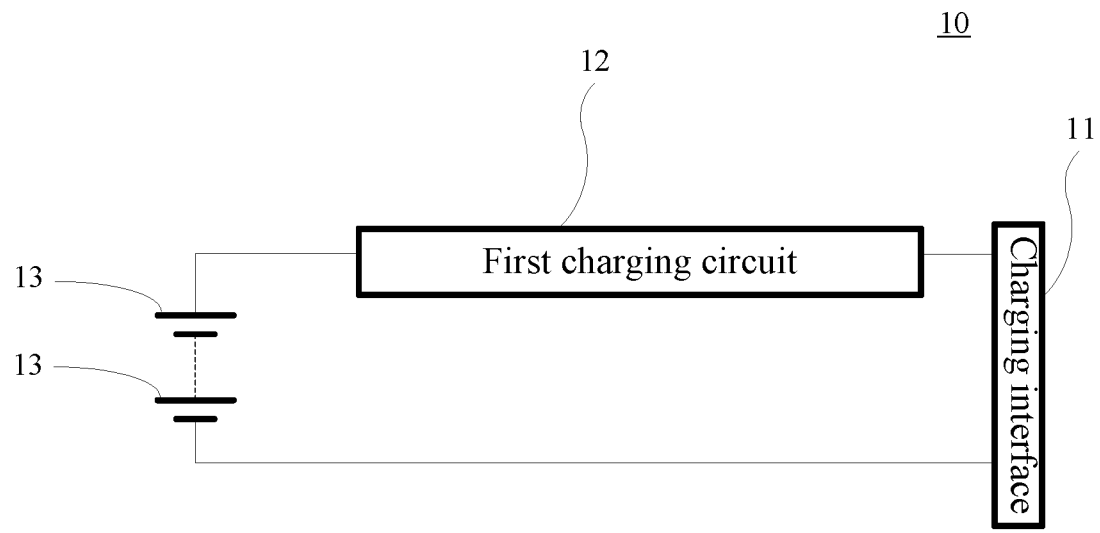
FIG. 1 is a schematic structure diagram illustrating a device to be charged according to an embodiment of the present disclosure.

Before describing a device to be charged and a charging method according to embodiments of the present disclosure, an adapter for charging the device to be charged in the related art (hereinafter, "related adapter") will be described.

Voltage outputted by the related adapter is basically constant, such as 5V, 9V, 12V or 20V or the like, when the related adapter works in a constant voltage mode.

The voltage outputted by the related adapter is unsuitable for being directly applied to both ends of a battery. It is required to convert the voltage by a conversion circuit in the device to be charged to obtain a charging voltage and/or charging current expected by the battery in the device to be charged. The charging current may be a direct current.

The conversion circuit is configured to convert the voltage outputted by the related adapter, to meet a requirement of the charging voltage and/or charging current expected by the battery.

As an example, the conversion circuit may be a charging management module, such as a charging integrated circuit (IC) in the device to be charged. During a charging process of the battery, the conversion circuit may be configured to manage the charging voltage and/or charging current of the battery. The conversion circuit may have at least one of a voltage feedback function and a current feedback function, so as to manage the charging voltage and/or charging current of the battery.

For example, the charging process of the battery may include at least one of a trickle charging stage, a constant current charging stage and a constant voltage charging stage. In the trickle charging stage, the conversion circuit may utilize a current feedback loop to ensure that a current flowing into the battery in the trickle charging stage meets the charging current (such as a first charging current) expected by the battery. In the constant current charging stage, the conversion circuit may utilize a current feedback loop to ensure that the current flowing into the battery in the constant current charging stage meets the charging current (such as a second charging current, which may be greater than the first charging current) expected by the battery. In the constant voltage charging stage, the conversion circuit may utilize a voltage feedback loop to ensure that a voltage applied to both ends of the battery in the constant voltage charging stage meets the charging voltage expected by the battery.

As an example, when the voltage outputted by the related adapter is greater than the charging voltage expected by the battery, the conversion circuit may be configured to perform a buck conversion on the voltage outputted by the related adapter to enable a buck-converted charging voltage to meet the requirement of the charging voltage expected by the battery. As another example, when the voltage outputted by the related adapter is less than the charging voltage expected by the battery, the conversion circuit may be configured to perform a boost conversion on the voltage outputted by the related adapter to enable a boost-converted charging voltage to meet the requirement of the charging voltage expected by the battery.

As another example, assume that the related adapter outputs a constant voltage of 5V. When the related adapter charges a single battery cell (such as a lithium battery cell, a charging cut-off voltage of a single battery cell is typically 4.2V), the conversion circuit (for example, a buck circuit) may perform a buck conversion on the voltage outputted by the related adapter, such that the charging voltage obtained after the buck conversion meets a requirement of the charging voltage expected by the single battery cell.

As yet another example, assume that the related adapter outputs a constant voltage of 5V. When the related adapter charges a plurality of (two or more) battery cells (such as lithium battery cell, a charging cut-off voltage of a single battery cell is typically 4.2V) coupled in series, the conversion circuit (for example, a boost circuit) may perform a boost conversion on the voltage outputted by the related adapter, such that the charging voltage obtained after the boost conversion meets a requirement of the charging voltage expected by the plurality of battery cells.

Limited by a poor conversion efficiency of the conversion circuit, a part of electric energy is lost in a form of heat, and the heat may gather inside the device to be charged. A design space and a space for heat dissipation of the device to be charged are small (for example, the physical size of a mobile terminal used by a user becomes thinner and thinner, while plenty of electronic elements are densely arranged in the mobile terminal to improve performance of the mobile terminal), which not only increases difficulty in designing the conversion circuit, but also results in that it is hard to dissipate the heat gathered in the device to be charged in time, thus further causing an abnormity of the device to be charged.

For example, the heat gathered on the conversion circuit may cause a thermal interference on electronic elements neighboring the conversion circuit, thus causing abnormal operations of the electronic elements. For another example, the heat gathered on the conversion circuit may shorten the service life of the conversion circuit and neighboring electronic elements. For yet another example, the heat gathered on the conversion circuit may cause a thermal interference on the battery, thus causing abnormal charging and/or abnormal discharging of the battery. For still another example, the heat gathered on the conversion circuit may increase the temperature of the device to be charged, thus affecting user experience during the charging. For still yet another example, the heat gathered on the conversion circuit may short-circuit the conversion circuit, such that the voltage outputted by the related adapter is directly applied to both ends of the battery, thus causing an over-voltage charging of the battery, which brings safety hazard if the over-voltage charging lasts for a long time, for example, the battery may explode.

The adapter according to embodiments of the present disclosure may obtain status information of the battery. The status information of the battery at least includes electric quantity information and/or voltage information of the battery. The adapter adjusts the voltage outputted by itself according to the obtained status information of the battery, to meet the requirement of the charging voltage and/or charging current expected by the battery. The output voltage after the adjustment may be directly applied to both ends of the battery for charging the battery (hereinafter, "direct charging"). The voltage outputted by the adapter may be a voltage with a stable voltage value or a voltage with a pulsating waveform.

The adapter may have a voltage feedback function and/or a current feedback function, so as to realize a closed-loop feedback control on the charging voltage and/or charging current of the battery.

In some embodiments, the adapter may adjust the voltage outputted by itself according to the obtained status information of the battery as follows. The adapter may obtain the status information of the battery in real time, and adjust the voltage outputted by itself according to the status information of the battery obtained in real time, to meet the charging voltage and/or charging current expected by the battery.

In some embodiments, the adapter may adjust the voltage outputted by itself according to the status information of the battery obtained in real time as follows. During the charging process, with the increasing of the charging voltage of the battery, the adapter may obtain status information of the battery at different time points in the charging process, and adjust the voltage outputted by itself in real time according to the status information of the battery at different time points in the charging process, to meet the requirement of the charging voltage and/or charging current expected by the battery. The output voltage after the adjustment of the adapter may be directly applied to both ends of the battery to charge the battery.

For example, the charging process of the battery may include at least one of a trickle charging stage, a constant current charging stage and a constant voltage charging stage. In the trickle charging stage, the adapter may output the first charging current (the first charging current may be a constant direct current or a current with a pulsating waveform) to charge the battery, so as to meet the requirement of the charging current expected by the battery. In the constant current charging stage, the adapter may utilize a current feedback loop to ensure that the current outputted by the adapter and flowing into the battery in the constant current charging stage meets the requirement of the charging current expected by the battery (such as a second charging current, which may be a constant direct current or a current with a pulsating waveform, and may be greater than the first charging current. For example, when the second charging current is a current with a pulsating waveform, the second charging current being greater than the first charging current means that, a peak value of the current with the pulsating waveform in the constant current charging stage is greater than that of the current with the pulsating waveform in the trickle charging stage, while "constant current" of the constant current charging stage means that, in the constant current charging stage, a peak value or a mean value of the current with the pulsating waveform is basically constant). In the constant voltage charging stage, the adapter may utilize a voltage feedback loop to ensure that a voltage (i.e., a voltage with a pulsating waveform) outputted by the adapter to the device to be charged within the constant voltage charging stage is constant.

For example, the adapter according to embodiments of the present disclosure is mainly configured to control the constant current charging stage of the battery in the device to be charged. In other embodiments, the control on the trickle charging stage and the constant voltage charging stage of the battery in the device to be charged can be realized by the adapter according to embodiments of the present disclosure in coordination with an additional charging chip in the device to be charged. Compared to the constant current charging stage, the charging power received by the battery in the trickle charging stage and the constant voltage charging stage is smaller, such that the conversion loss and heat accumulation of the charging chip in the device to be charged is acceptable. It some embodiments, the constant current charging stage or the constant current mode involved in embodiments of the present disclosure may refer to a charging stage or a charging mode in which the current outputted by the adapter is controlled. It is unnecessary to keep the current outputted by the adapter completely constant. For example, when the current outputted by the adapter is a current with a pulsating waveform, the constant current may refer to that, a peak value or a mean value of the current with the pulsating waveform outputted by the adapter is basically constant, or keeps constant during a certain time period. For example, in practice, the adapter typically adopts a multi-stage constant current mode for charging in the constant current charging stage.

The multi-stage constant current charging may include M constant current stages, where M is an integer no less than 2. The first charging stage of the multi-stage constant current charging starts with a predetermined charging current. M constant current stages in the multi-stage constant current charging are performed in sequence from the first charging stage to the $(M-1)^{th}$ charging stage. After the constant current charging is switched from one constant current stage to the next constant current stage, the peak value or mean value of the current with the pulsating waveform may be decreased. When the battery voltage reaches a charging stop voltage threshold, the constant current charging is switched from the present constant current stage to the next constant current stage. The current change between two adjacent constant current stages may be gradual, or may be in a stepped skip manner.

Further, it should be noted that, the device to be charged according to embodiments of the present disclosure may, for example, be a terminal or a communication terminal. The terminal or the communication terminal includes, but is not limited to a device configured to receive/transmit communication signals via a wired connection (for example, public switched telephone network (PSTN), digital subscriber line (DSL) connection, digital cable connection, direct cable connection and/or another data connection/network) and/or via a wireless interface (for example, cellular network, wireless local area network (WLAN), digital TV network such as digital video broadcasting handheld (DVB-H) network, satellite network, an amplitude modulation-frequency modulation (AM-FM) broadcasting transmitter, and/or a wireless interface of another communication terminal). The communication terminal configured to communicate via the wireless interface may be referred to as "wireless communication terminal", "wireless terminal" and/or "mobile terminal". Examples of a mobile terminal include, but are not limited to a satellite phone or a cell phone, a terminal combining a cell radio phone and a personal communication system (PCS) having capability of data process, fax, and data communication, a personal digital assistant (PDA) including a radio phone, a pager, Internet/Intranet access, a web browser, a note pad & address book, a calendar and/or a global positioning system (GPS) receiver, and a common laptop and/or handheld receiver, or other electronic devices including a radio phone transceiver.

In addition, in embodiments of the present disclosure, when the voltage with the pulsating waveform outputted by the adapter is directly applied to both ends of the battery in the device to be charged to charge the battery, the charging current may be characterized by a pulsating waveform such as a steamed bun waveform. In some embodiments, the charging current may be used to charge the battery intermittently. A period of the charging current may vary with a frequency of an input alternating current (such as a frequency of an alternating current power grid). For example, the frequency corresponding to the period of the charging current may be an integral multiple or a fraction of the frequency of the power grid. Moreover, when the charging current is used to charge the battery intermittently, a current waveform corresponding to the charging current may be formed of one pulse or a set of pulses synchronous to the power grid.

As an example, during the charging process (such as, at least one of the trickle charging stage, the constant current charging stage and the constant voltage charging stage), the battery may receive the pulsating direct current (having a direction unchanged and amplitude varying with time), the alternating current (having a direction and amplitude both varying with time) or the constant direct current (having a direction and amplitude both unchanged) outputted by the adapter.

In the related art, the device to be charged typically includes only a single battery cell. When the single battery cell is charged with large charging current, a serious heating phenomenon occurs on the device to be charged. In order to ensure the charging speed of the device to be charged and relieve the heating phenomenon on the device to be charged during the charging, the structure of the battery cell in the device to be charged according to embodiments of the present disclosure is improved by incorporating a plurality of battery cells coupled in series, and a direct charging is performed on the plurality of battery cells. Embodiments of the present disclosure will be described in detail with reference to FIG. 1.

FIG. 1 is a schematic structure diagram illustrating a device to be charged according to embodiments of the present disclosure. The device 10 to be charged in FIG. 1 includes a charging interface 11 and a first charging circuit 12. The first charging circuit 12 is coupled with the charging interface 11. The first charging circuit 12 receives an output voltage and an output current of an adapter via the charging interface 11, and directly applies the output voltage and the output current of the adapter to both ends of the plurality of battery cells 13 coupled in series in the device to be charged so as to perform a direct charging on the plurality of battery cells 13.

In order to solve the heating problem due to a conversion circuit and to reduce power consumption, in embodiments of the present disclosure, the plurality of battery cells 13 are charged in a direct charging manner via the first charging circuit 12.

The solution of direct charging can reduce the heat generated in the device to be charged to some extent. However, when the output current of the adapter is too large, for example, when the output current of the adapter reaches a value ranging from 5 A to 10 A, the device to be charged may have a serious heating problem, thus causing a safety hazard. In order to ensure the charging speed and to further relieve the heating phenomenon of the device to be charged, in embodiments of the present disclosure, the structure of the battery cell in the device to be charged is further improved, i.e., the plurality of battery cells coupled in series are incorporated. Compared to the solution of a single battery cell, to achieve the same charging speed, the charging current required by the plurality of battery cells is 1/N (N is the number of the plurality of battery cells coupled in series in the device to be charged) of that required by the single battery cell. In other words, under the premise of the same charging speed, the charging current may be reduced greatly in embodiments of the present disclosure, thus further reducing the heat generated during the charging process in the device to be charged.

For example, for the single battery cell of 3000 mAh, a charging current of 9 A is required to reach a charging rate of 3 C. In order to reach the same charging speed and to reduce the heat generated during the charging process in the device to be charged, two battery cells each of which is 1500 mAh may be coupled in series, so as to replace a single battery cell of 3000 mAh. In this way, it merely requires a charging current of 4.5 A to reach the charging rate of 3 C. Compared to a charging current of 9 A, the charging current of 4.5 A causes obviously less heat.

In some embodiments, since the first charging circuit 12 charges the plurality of battery cells 13 in the direct charging manner, the output voltage received by the first charging circuit 12 from the adapter needs to be greater than a total voltage of the plurality of battery cells 13. Generally, a working voltage of a single battery cell is typically within 3.0V-4.35V. For example, for two battery cells coupled in series, the output voltage of the adapter may be greater than or equal to 10V.

In some embodiments, a type of the charging interface 11 is not limited in embodiments of the present disclosure. For example, the charging interface 11 may be a universal serial bus (USB) interface, which may be a common USB interface or a micro USB interface, or a Type-C interface. The first charging circuit 12 may charge the plurality of battery cells 13 via a power wire in the USB interface. The power wire in the USB interface may be a VBus wire and/or a ground wire in the USB interface.

The plurality of battery cells 13 in embodiments of the present disclosure may include battery cells with the same or similar specification and parameters. The battery cells with the same or similar specification are easy to manage. The overall performance and service life of the plurality of battery cells 13 can be improved when battery cells with the same or similar specification and parameters are selected.

In some embodiments, the plurality of battery cells 13 coupled in series can realize voltage-dividing on the output voltage of the adapter.

In the related art, the device to be charged (or elements in the device to be charged, or a chip in the device to be charged) typically adopts a single battery cell for power supply. In embodiments of the present disclosure, the plurality of battery cells coupled in series are incorporated, which have a high total voltage unsuitable for being used to supply power for the device to be charged (or elements in the device to be charged, or a chip in the device to be charged) directly. For solving this problem, one feasible implementation is to adjust the working voltage of the device to be charged (or elements in the device to be charged, or a chip in the device to be charged) to support the power supply of the plurality of battery cells. However, with this implementation, the device to be charged needs to be changed greatly, thus causing a high cost. In the following, an implementation according to embodiments of the present disclosure is described in detail with reference to FIG. 2 and FIG. 3, in which the problem of how to supply power using the plurality of battery cells can be solved.

Figure 2:
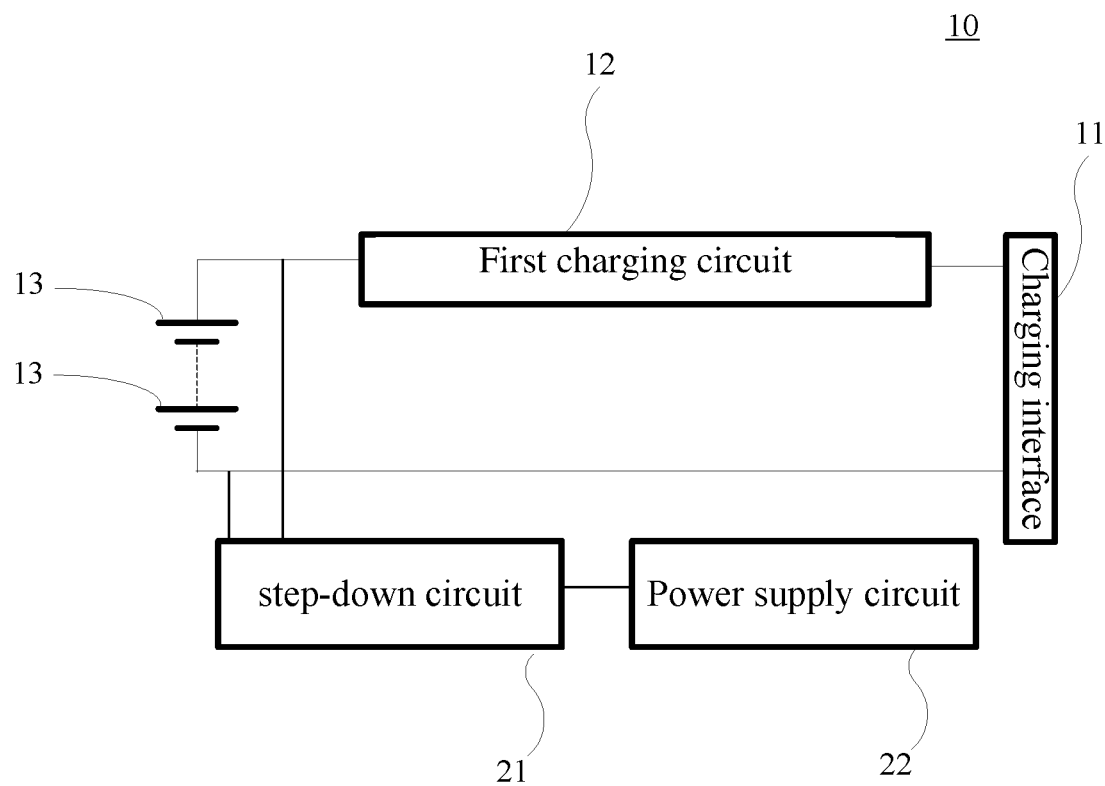
FIG. 2 is a schematic structure diagram illustrating a device to be charged according to another embodiment of the present disclosure.

In some embodiments, as illustrated in FIG. 2, the device 10 to be charged further includes a step-down circuit 21 and a power supply circuit 22. An input end of the step-down circuit 21 is coupled to both ends of the plurality of battery cells 13 respectively. The step-down circuit 21 is configured to convert the total voltage of the plurality of battery cells 13 into a first voltage V1, where $a \leq V1 \leq b$, a represents the minimum working voltage of the device 10 to be charged (or elements in the device 10 to be charged, or a chip in the device 10 to be charged), and b represents the maximum working voltage of the device 10 to be charged (or elements in the device 10 to be charged, or a chip in the device 10 to be charged). The power supply circuit 22 is coupled to an output end of the step-down circuit 21. The power supply circuit 22 supplies power for the device 10 to be charged based on the first voltage.

In embodiments of the present disclosure, the step-down circuit 21 is incorporated on the basis of the embodiment described with regard to FIG. 1. When the device to be charged is in a working state, the total voltage of the plurality of battery cells 13 is stepped down by the step-down circuit 21 to obtain a first voltage. Since the first voltage is between the minimum working voltage and the maximum working voltage of the device 10 to be charged, the first voltage can be directly used to supply power for the device to be charged, thus solving the problem of how to supply power using the plurality of battery cells.

In some embodiments, the total voltage of the plurality of battery cells 13 varies with the electric quantity of the plurality of battery cells 13. The aforementioned total voltage of the plurality of battery cells 13 may refer to a present total voltage of the plurality of battery cells 13. For example, the working voltage of a single battery cell is in a range of 3.0V-4.35V. Assuming that the plurality of battery cells include two battery cells and the present voltage of each battery cell is 3.5V, the aforementioned total voltage of the plurality of battery cells 13 is 7V.

For example, the working voltage of the single battery cell is in a range of 3.0V-4.35V, i.e., a=3.0V and b=4.35V. In order to ensure that the power supply voltage of elements in the device to be charged is normal, the step-down circuit 21 may step down the total voltage of the plurality of battery cells 13 to any value in the range of 3.0V-4.35V. There are many ways to implement the step-down circuit 21, for example, a buck circuit, a charge pump or the like can be used for stepping down voltage.

In some embodiments, for simplifying the implementation of a circuit, the step-down circuit 21 may be a charge pump. With the charge pump, the total voltage of the plurality of battery cells 13 may be directly stepped down to 1/N of the present total voltage, where N is the number of the plurality of battery cells 13. A conventional buck circuit includes a switch transistor, an inductor and other elements. Since the power consumption of the inductor is large, the power consumption is high when the buck circuit is used to buck voltage. Compared to the buck circuit, the charge pump mainly utilizes a switch transistor and a capacitor to buck voltage, and the capacitor does not consume additional energy basically. Thus, the power consumption during the step-down process can be decreased when the charge pump is used. In detail, the switch transistor in the charge pump controls the charging and discharging of the capacitor in a certain manner, such that the input voltage is stepped down by a certain factor (in embodiments of the present disclosure, the factor is 1/N), and the desired voltage can be obtained.

Figure 3:
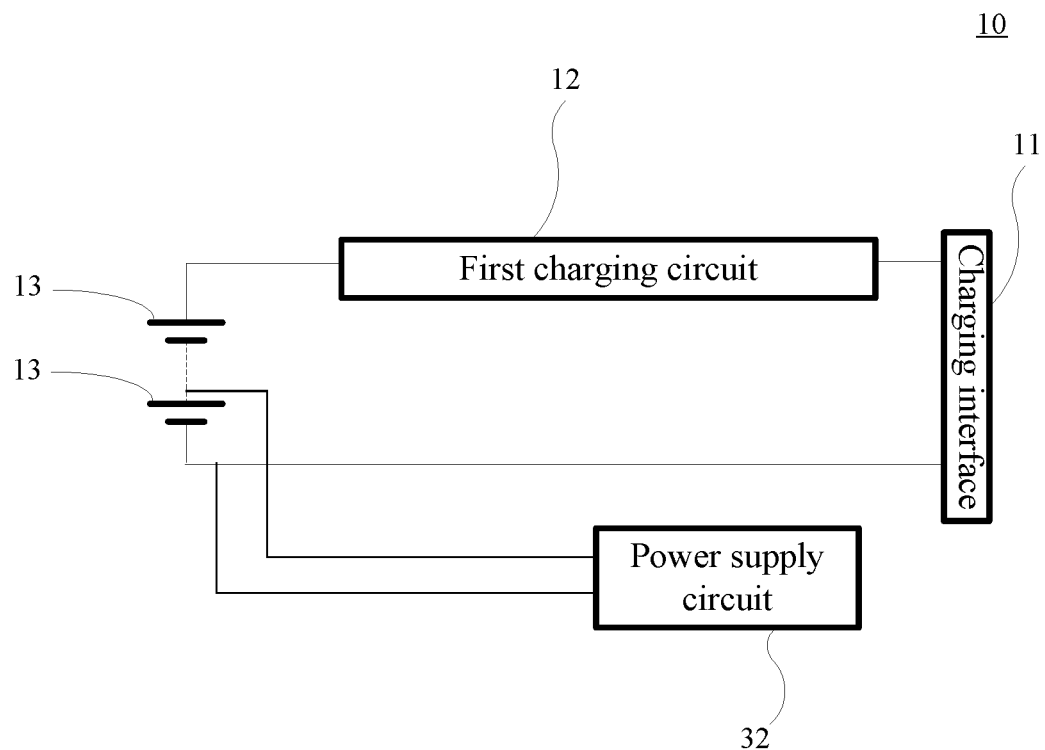
FIG. 3 is a schematic structure diagram illustrating a device to be charged according to yet another embodiment of the present disclosure.

In some embodiments, as illustrated in FIG. 3, the device 10 to be charged further includes a power supply circuit 32. An input end of the power supply circuit 32 is coupled to both ends of any one of the plurality of battery cells 13. The power supply circuit 32 supplies power for the elements in the device 10 to be charged based on the voltage of a single battery cell 13.

In some embodiments, the voltage after the buck conversion of the step-down circuit may have a pulsating wave, thus affecting the quality of power supply of the device to be charged. In embodiments of the present disclosure, the power supply voltage is derived from both ends of one of the plurality of battery cells 13 directly to supply power for elements in the device to be charged. Since the voltage outputted by the battery cell is stable relatively, in embodiments of the present disclosure, not only the problem of how to supply power using the plurality of battery cells can be solved but also the quality of power supply of the device to be charged can be guaranteed.

Figure 4:
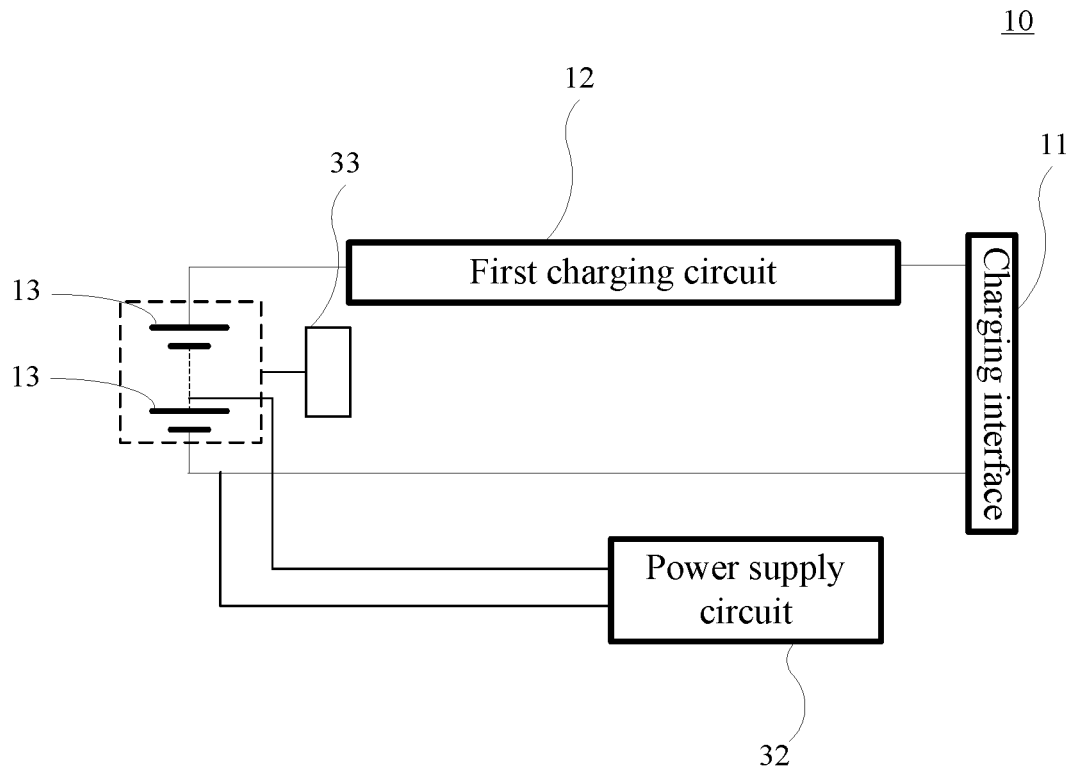
FIG. 4 is a schematic structure diagram illustrating a device to be charged according to still another embodiment of the present disclosure.

Further, on the basis of the embodiment described with regard to FIG. 3, as illustrated in FIG. 4, the device 10 to be charged further includes an equalization circuit 33. The equalization circuit 13 is coupled with the plurality of battery cells 13. The equalization circuit 13 is configured to equalize voltages of respective battery cells of the plurality of battery cells 13.

When the power supply mode illustrated in FIG. 3 is adopted, the battery cell that supplies power for the elements in the device to be charged (hereinafter, this battery cell is referred to as a main battery cell, and other battery cells are referred as slave battery cells) consume electric quantity constantly, such that the voltage of the main battery cell and the voltage of the salve battery cell are not equalized (or, the voltage of the main battery cell and the voltage of the slave battery cell are inconsistent). The overall performance of the plurality of battery cells 13 is decreased when the voltages of respective battery cells 13 are not equalized, thus affecting the service life of the plurality of battery cells 13. In addition, it is hard to manage the plurality of battery cells 13 when the voltages of respective battery cells 13 are not equalized. Thus, in embodiments of the present disclosure, the equalization circuit 33 is introduced, to equalize the voltages of respective cells of the plurality of battery cells 13, thus improving the overall performance of the plurality of battery cells 13 and facilitating the unified management of the plurality of battery cells 13.

There are many ways to implement the equalization circuit 33. For example, a load may be coupled to both ends of the slave battery cell to consume the electric quantity of the slave battery cell, such that the electric quantity of the slave battery cell may be consistent with the electric quantity of the main battery cell. In an embodiment, the slave battery cell may be used to charge the main battery cell, until the voltage of the main battery cell is consistent with the voltage of the slave battery cell.

Figure 15:
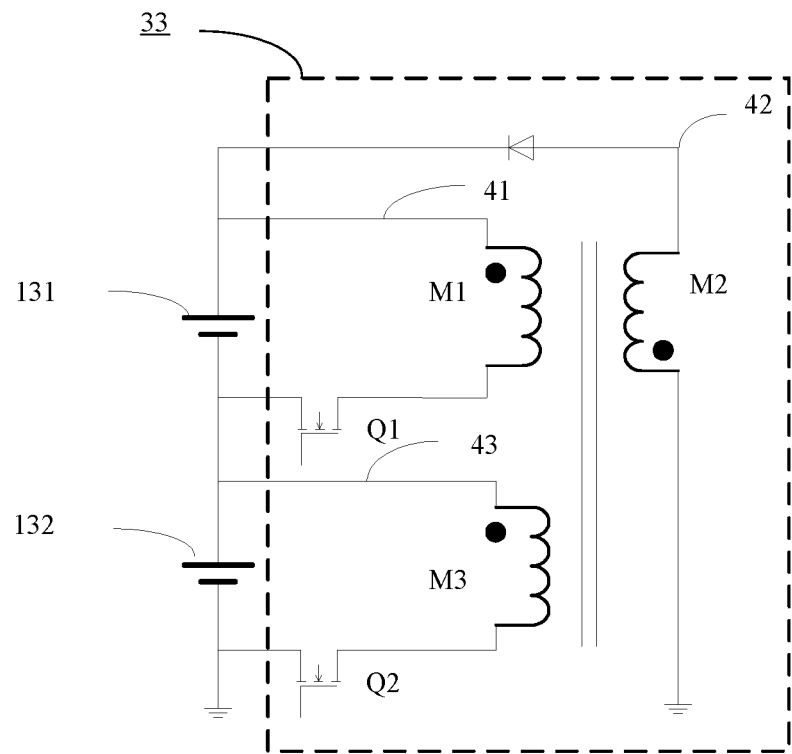
FIG. 15 is a schematic circuit diagram illustrating an equalization circuit according to an embodiment of the present disclosure.

As an example, the plurality of battery cells 13 may include a first battery cell 131 and a second battery cell 132 (see FIG. 15). The equalization circuit 33 is configured to transfer electric quantity between the first battery cell and the second battery cell in an electromagnetic coupling manner.

In embodiments of the present disclosure, the equalization circuit is configured to equalize the voltages of respective battery cells in the electromagnetic coupling manner, such that the overall performance of the plurality of battery cells 13 is improved and it is convenient to manage the plurality of battery cells 13.

In an embodiment, the first battery cell 131 may be the slave battery cell and the second battery cell 132 may be the main battery cell. The first battery cell 131 may transfer electric quantity to the second battery cell 132 via the equalization circuit 33.

In an embodiment, each of the first battery cell 131 and the second battery cell 132 may include one battery cell or may include at least two battery cells, which is not limited herein.

In an embodiment, when each of the first battery cell 131 and the second battery cell 132 includes one battery cell, the first battery cell 131 may be any one of the plurality of battery cells 13, and the second battery cell 132 may be any battery cell other than the first battery cell 131 in the plurality of battery cells 13.

Figure 11:
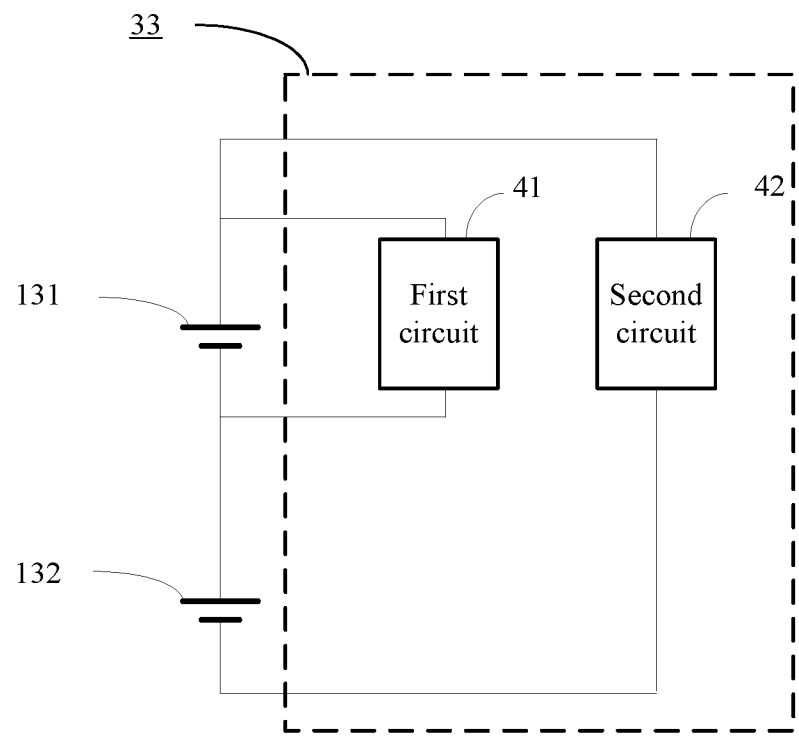
FIG. 11 is a schematic structure diagram illustrating an equalization circuit according to an embodiment of the present disclosure.

As an example, as illustrated in FIG. 11, the equalization circuit 33 may include a first circuit 41 and a second circuit 42. The first circuit 41 is coupled with the first battery cell 131, and the second circuit 42 is coupled with the first battery cell 131 and the second battery cell 132 respectively. When the first circuit 41 is switched on, the first circuit 41 is configured to couple energy outputted by the first battery cell 131 to the second circuit 42 in an electromagnetic coupling manner, such that the second circuit 42 generates a first charging current based on the energy from the first circuit 41, and charges the first battery cell and the second battery cell with the first charging current.

In embodiments of the present disclosure, the first circuit 41 in the equalization circuit 33 couples the energy outputted by the first battery cell 131 to the second circuit 42, and the second circuit 42 generates the first charging current based on the energy from the first circuit 41, and charges the first battery cell 131 and the second battery cell 132 with the first charging current. When the first circuit is switched on, the equalization circuit 33 transfers the energy obtained from the firs battery cell 131 to the first battery cell 131 and the second battery cell 132, so as to realize an electric quantity transfer between the first battery cell 131 and the second battery cell 132.

Figure 12:
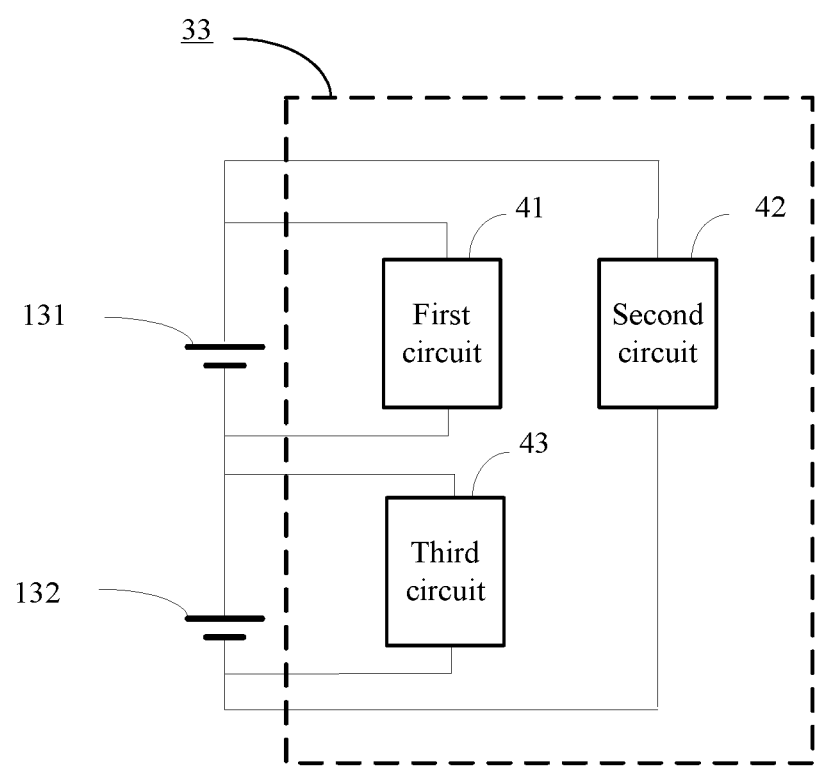
FIG. 12 is a schematic structure diagram illustrating an equalization circuit according to another embodiment of the present disclosure.

In an embodiment, as illustrated in FIG. 12, the equalization circuit 33 further includes a third circuit 43. The third circuit 43 is coupled with the second battery cell 132. When the third circuit 43 is switched on, the third circuit 43 is configured to couple energy outputted by the second battery cell 132 to the second circuit 42 in an electromagnetic coupling manner, such that the second circuit 42 generates a second charging current based on the energy from the third circuit 43, and charges the first battery cell 131 and the second battery cell 132 with the second charging current.

In embodiments of the present disclosure, when the third circuit 43 is switched on, the equalization circuit 33 can also transfer the energy obtained from the second battery cell 132 to the first battery cell 131 and the second battery cell 132, so as to realize the electric quantity transfer between the first battery cell 131 and the second battery cell 132.

In an embodiment, in an example illustrated in FIG. 12, when the voltage of the first battery cell 131 is greater than that of the second battery cell 132, the first circuit 41 and the second circuit 42 may be switched on, and the third circuit 43 may be switched off, such that the energy of the first battery cell 131 is transferred to the first battery cell 131 and the second battery cell 132. When the voltage of the second battery cell 132 is greater than that of the first battery cell 131, the first circuit 41 may be switched off, and the second circuit 42 and the third circuit 43 may be switched on, such that the energy of the second battery cell 132 is transferred to the first battery cell 131 and the second battery cell 132. In this way, voltage equalization of respective battery cells can be realized.

Figure 13:
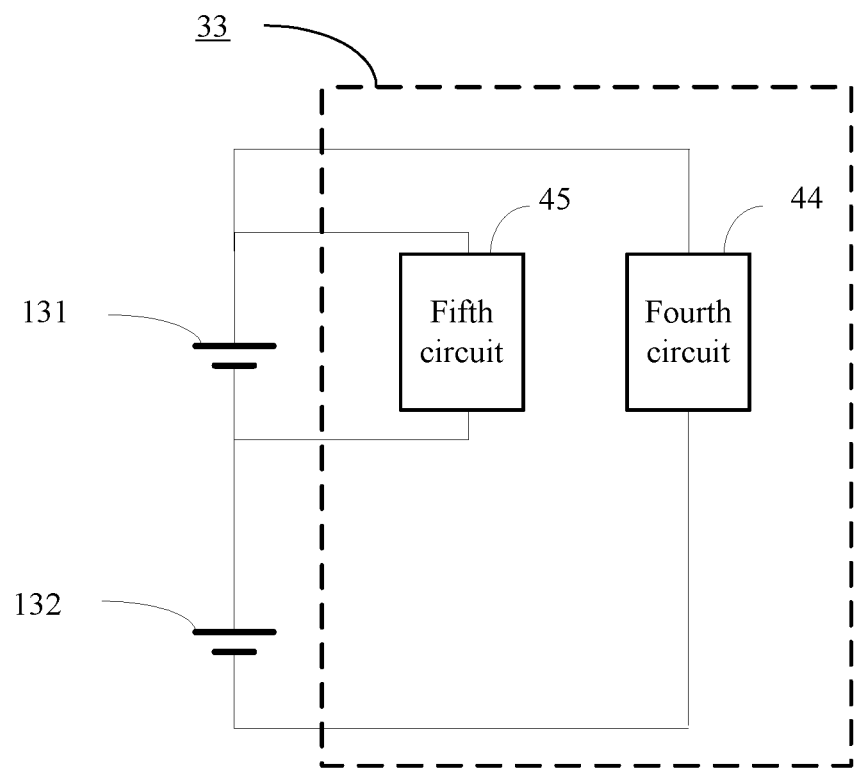
FIG. 13 is a schematic structure diagram illustrating an equalization circuit according to yet another embodiment of the present disclosure.

FIG. 13 is a schematic structure diagram illustrating an equalization circuit according to another embodiment of the present disclosure. As illustrated in FIG. 13, the equalization circuit 33 includes a fourth circuit 44 and a fifth circuit 45. The fourth circuit 44 is coupled with the first battery cell 131 and the second battery cell 132 respectively, and the fifth circuit 45 is coupled with the first battery cell 131. When both the fourth circuit 44 and the fifth circuit 45 are switched on, the fourth circuit 44 is configured to couple energy outputted by the first battery cell 131 and the second battery cell 132 to the fifth circuit 45 in an electromagnetic coupling manner, such that the fifth circuit 45 generates a second charging current based on the energy from the fourth circuit 44, and charges the first battery cell 131 with the second charging current.

In embodiments of the present disclosure, the fourth circuit 44 in the equalization circuit 33 couples the energy outputted by the first battery cell 131 and the second battery cell 132 to the fifth circuit 45, and the fifth circuit 45 generates the second charging current based on the energy from the fourth circuit 44, and charges the first battery cell 131 with the second charging current. When the fourth circuit 44 is switched on, the equalization circuit 33 transfers the energy obtained from the first battery cell 131 and the second battery cell 132 to the first battery cell 131, so as to realize an electric quantity transfer between the first battery cell 131 and the second battery cell 132.

Figure 14:
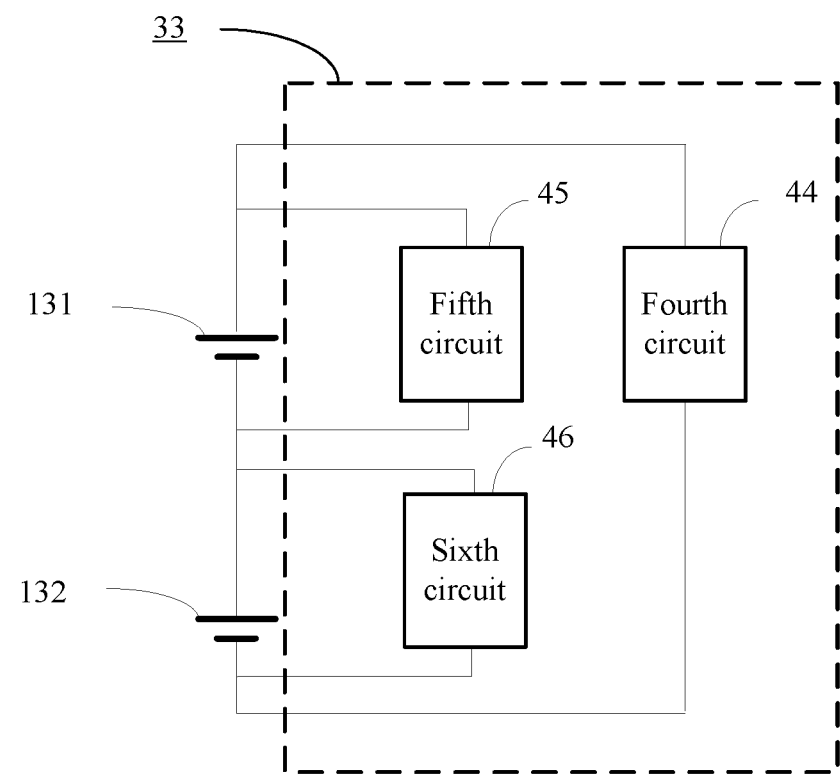
FIG. 14 is a schematic structure diagram illustrating an equalization circuit according to still another embodiment of the present disclosure.

In an embodiment, as illustrated in FIG. 14, the equalization circuit 33 further includes a sixth circuit 46. The sixth circuit 46 is coupled with the second battery cell 132. When both the fourth circuit 44 and the sixth circuit 46 are switched on, the fourth circuit 44 is configured to couple energy outputted by the first battery cell 131 and the second battery cell 132 to the sixth circuit 46 in an electromagnetic coupling manner, such that the sixth circuit 46 generates a third charging current based on the energy from the fourth circuit 44, and charges the second battery cell 132 with the third charging current.

In embodiments of the present disclosure, when the sixth circuit 46 is switched on, the equalization circuit 33 can transfer the energy obtained from the first battery cell 131 and the second battery cell 132 to the second battery cell 132, so as to realize the electric quantity transfer between the first battery cell 131 and the second battery cell 132.

In an embodiment, in an example illustrated in FIG. 14, when the voltage of the second battery cell 132 is greater than that of the first battery cell 131, the fourth circuit 44 and the fifth circuit 45 may be switched on, and the sixth circuit 46 may be switched off, such that the energy of the first battery cell 131 and the second battery cell 132 is transferred to the first battery cell 131. When the voltage of the first battery cell 131 is greater than that of the second battery cell 132, the fifth circuit 45 may be switched off, and the fourth circuit 44 and the sixth circuit 46 may be switched on, such that the energy of the first battery cell 131 and the second battery cell 132 is transferred to the second battery cell 132. In this way, voltage equalization of respective battery cells can be realized.

FIG. 15 is a circuit schematic illustrating an equalization circuit according to an embodiment of the present disclosure. As illustrated in FIG. 15, the first circuit 41 may include a first inductor M1 and a switch transistor Q1. The second circuit 42 may include a second inductor M2 and a rectifier diode. The third circuit 43 may include a third inductor M3 and a switch transistor Q2. The first inductor M1 and the second inductor M2 are coupled with each other, and the second inductor M2 and the third inductor M3 are coupled with each other.

In an example illustrated in FIG. 15, the switch transistor Q1 or the switch transistor Q2 may be configured to generate a pulse current.

For example, when the switch transistor Q1 works and the switch transistor Q2 is switched off, the equalization circuit 33 may transfer the electric quantity of the first battery cell 131 to the first battery cell 131 and the second battery cell 132 in an electromagnetic coupling manner.

Similarly, when the switch transistor Q2 works and the switch transistor Q1 is switched off, the equalization circuit 33 may transfer the electric quantity of the second battery cell 132 to the first battery cell 131 and the second battery cell 132 in an electromagnetic coupling manner.

Figure 16:
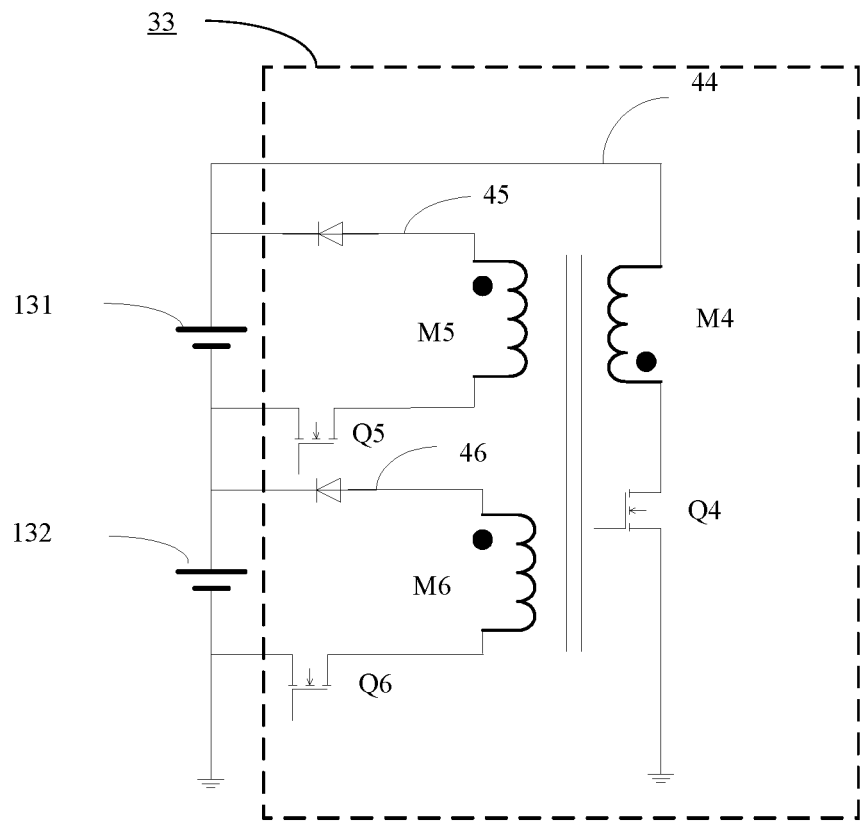
FIG. 16 is a schematic circuit diagram illustrating an equalization circuit according to another embodiment of the present disclosure.

FIG. 16 is a circuit schematic illustrating an equalization circuit according to another embodiment of the present disclosure. As illustrated in FIG. 16, the fourth circuit 44 may include a fourth inductor M4 and a switch transistor Q4. The fifth circuit 45 may include a fifth inductor M5 and a switch transistor Q5. The sixth circuit 46 may include a sixth inductor M6 and a switch transistor Q6. The fourth inductor M4 and the fifth inductor M5 are coupled with each other, and the fourth inductor M4 and the sixth inductor M6 are coupled with each other.

In an example illustrated in FIG. 16, the switch transistor Q4 is configured to generate a pulse current. The switch transistor Q5 is configured to control the fifth circuit 45 to switch on or off and the switch transistor Q6 is configured to control the sixth circuit 46 to switch on or off.

For example, when the switch transistor Q4 works, the switch transistor Q5 is switched on, and the switch transistor Q6 is switched off, the equalization circuit 33 may transfer the electric quantity of the first battery cell 131 and the second battery cell 132 to the first battery cell 131 in an electromagnetic coupling manner.

Similarly, when the switch transistor Q4 works, the switch transistor Q5 is switched off, and the switch transistor Q6 is switched on, the equalization circuit 33 may transfer the electric quantity of the first battery cell 131 and the second battery cell 132 to the second battery cell 132 in an electromagnetic coupling manner.

As the output power of the adapter increases, a lithium precipitation may occur when the adapter charges the battery cell in the device to be charged, thus shortening the service life of the battery cell.

Figure 5:
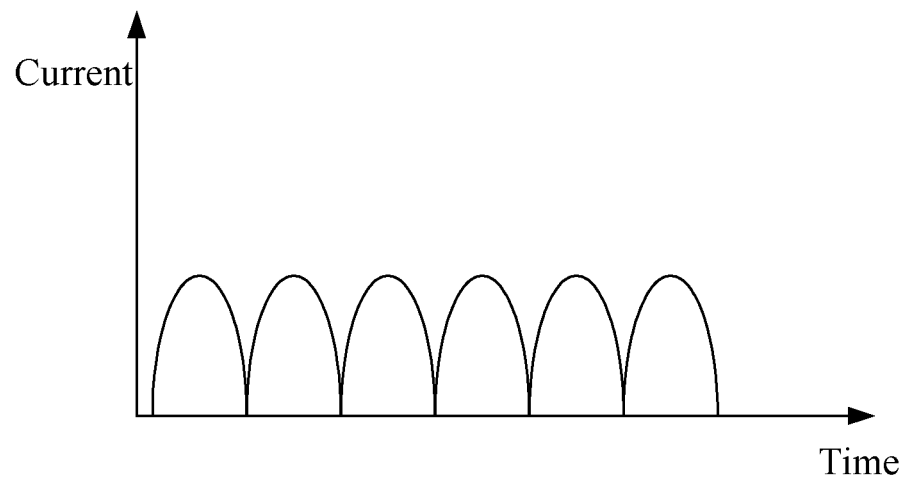
FIG. 5 is a schematic diagram illustrating a waveform of a pulsating direct current according to an embodiment of the present disclosure.

In order to improve the reliability and safety of the battery cell, in some embodiments, the adapter may be controlled to output a pulsating direct current (or called as a unidirectional pulsating output current, or called as a current with a pulsating waveform, or called as a steamed bun current). Since the first charging circuit 12 charges the plurality of battery cells 13 in a direct charging manner, the pulsating direct current outputted by the adapter may be directly applied to both ends of the plurality of battery cells 13. As illustrated in FIG. 5, the magnitude of the pulsating direct current changes periodically. Compared to the constant direct current, the pulsating direct current may reduce the lithium precipitation and improve the service life of the battery cell. In addition, compared to the constant direct current, the pulsating direct current may reduce a probability and intensity of arc discharge of a contact of a charging interface and improve the service life of the charging interface.

There are many ways to set the output current of the adapter as the pulsating direct current. For example, a primary filter circuit and a secondary filter circuit may be removed from the adapter, such that the obtained output current of the adapter is the pulsating direct current.

In some embodiments, the output current of the adapter received by the first charging circuit 12 may be an alternating current (for example, the primary filter circuit, a secondary rectifier circuit and the secondary filter circuit are removed from the adapter, and then the obtained output current of the adapter is the alternating current), which also can reduce the lithium precipitation and improve the service life of the battery cell.

In some embodiments, the output voltage and the output current of the adapter received by the first charging circuit 12 via the charging interface 11 may be a voltage and a current outputted by the adapter in a constant current mode (the constant current charging mode or the constant current charging stage) respectively.

Figure 6:
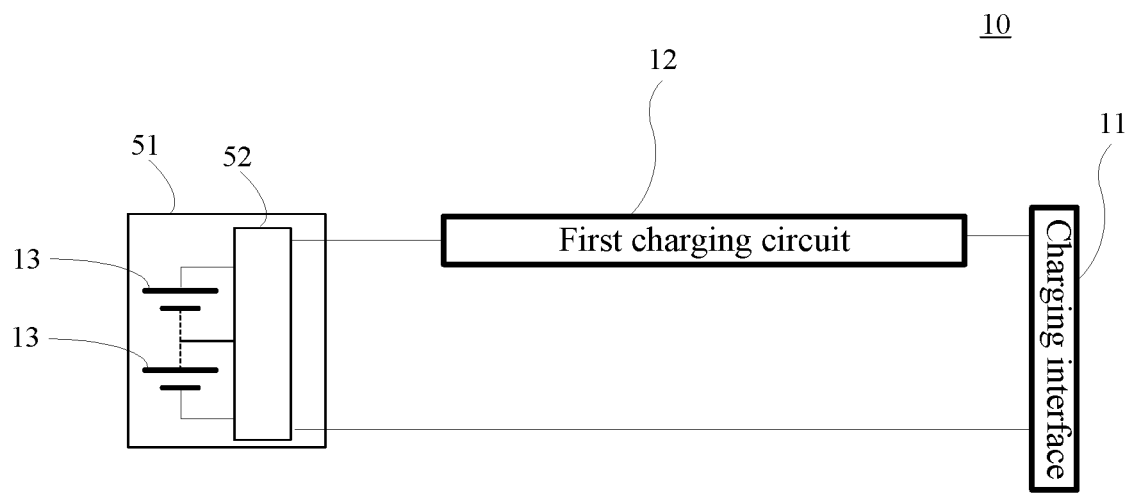
FIG. 6 is a schematic structure diagram illustrating a device to be charged according to still yet another embodiment of the present disclosure.

In some embodiments, as illustrated in FIG. 6, the plurality of battery cells 13 may be encapsulated in one battery 51. Further, the battery 51 may include a battery protection plate 52, by means of which over-voltage and over-current protection, electric quantity balance management and electric quantity management or the like may be realized.

In some embodiments, the plurality of battery cells 13 may be encapsulated in a plurality of batteries.

Figure 7:
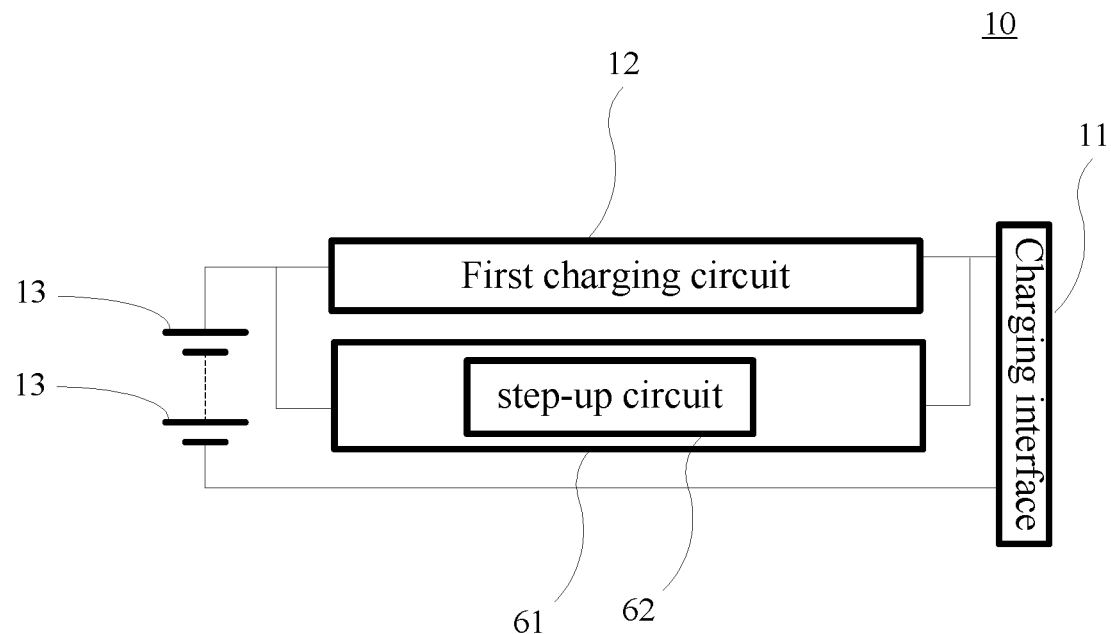
FIG. 7 is a schematic structure diagram illustrating a device to be charged according to still yet another embodiment of the present disclosure.

In some embodiments, as illustrated in FIG. 7, the device 10 to be charged may further include a second charging circuit 61. The second charging circuit 61 may include a step-up circuit 62. The step-up circuit 62 has both ends coupled to the charging interface 11 and the plurality of battery cells 13 respectively. The step-up circuit 62 may receive the output voltage of the adapter via the charging interface 11, step up the output voltage of the adapter to a second voltage, and apply the second voltage to both ends of the plurality of battery cells 13 to charge the plurality of battery cells 13. The output voltage of the adapter received by the second charging circuit 61 is less than the total voltage of the plurality of battery cells 13, and the second voltage is greater than the total voltage of the plurality of battery cells 13.

It can be seen that, the first charging circuit 12 charges the plurality of battery cells 13 in a direct charging manner. In the direct charging manner, it is required that the output voltage of the adapter is greater than the total voltage of the plurality of battery cells 13. For example, in a case that two battery cells are coupled in series, if the present voltage of each battery cell is 4V, it is required that the output voltage of the adapter is at least greater than 8V when the first charging circuit 12 is used to charge the two battery cells. However, an output voltage of a normal adapter (such as the related adapter above mentioned) is typically 5V, which is unable to charge the plurality of battery cells 13 via the first charging circuit 12. For compatibility with the normal adapter, the second charging circuit 61 is incorporated in embodiments of the present disclosure, and the second charging circuit 61 includes the step-up circuit 62 which may step up the output voltage of the adapter to the second voltage greater than the total voltage of the plurality of battery cells 13, such that the problem that the normal adapter cannot charge the plurality of battery cells 13 coupled in series is solved.

The voltage value of the output voltage of the adapter received by the second charging circuit 61 is not limited in embodiments of the present disclosure, as long as the output voltage of the adapter is less than the total voltage of the plurality of battery cells 13, and the plurality of battery cells 13 can be charged after the output voltage of adapter is stepped up by the second charging circuit 61.

The specific form of the step-up circuit is not limited in embodiments of the present disclosure. For example, a boost circuit or a charge pump can be used to boost the voltage. In some embodiments, the second charging circuit 61 may be designed as a conventional charging circuit, i.e., a conversion circuit (such as a charging IC) is disposed between the charging interface and the battery cell. The conversion circuit may perform a constant voltage and constant current control on the charging process of the adapter, and adjust the output voltage of the adapter according to actual situations, for example, boost or buck voltage. In embodiments of present disclosure, the voltage boost function of the conversion circuit is used for boosting the output voltage of the adapter to the second voltage greater than the total voltage of the plurality of battery cells 13. In some embodiments, a switching between the first charging circuit 12 and the second charging circuit 61 may be realized via a switch or a control unit. For example, the control unit is disposed inside the device to be charged. The control unit may switch between the first charging circuit 12 and the second charging circuit 61 flexibly according to actual requirements, such as according to a type of the adapter.

In some embodiments, the adapter supports a first charging mode and a second charging mode. The charging speed at which the adapter charges the device to be charged in the second charging mode is faster than the charging speed at which the adapter charges the device to be charged in the first charging mode.

In some embodiments, in the first charging mode, the adapter charges the plurality of battery cells 13 via the second charging circuit 61. In the second charging mode, the adapter charges the plurality of battery cells 13 via the first charging circuit 12. In other words, compared to the adapter working in the first charging mode, the adapter working in the second charging mode can fully charge the battery having the same capacity in a shorter time.

The first charging mode can be a normal charging mode and the second charging mode can be a quick charging mode. Under the normal charging mode, the adapter outputs a relatively small current (typically less than 2.5 A) or charges the battery in the device to be charged with a relatively small power (typically less than 15 W). In the normal charging mode, it may take several hours to fully charge a larger capacity battery (such as a battery with 3000 mAh). In contrast, under the quick charging mode, the adapter can output a relatively large current (typically greater than 2.5 A, such as 4.5 A, 5 A or higher) or charges the battery in the device to be charged with a relatively large power (typically greater than or equal to 15 W). Compared to the normal charging mode, the charging speed of the adapter in the quick charging mode is faster, and the charging time required for fully charging a battery with the same capacity in the quick charging mode may be significantly shortened.

Figure 8:
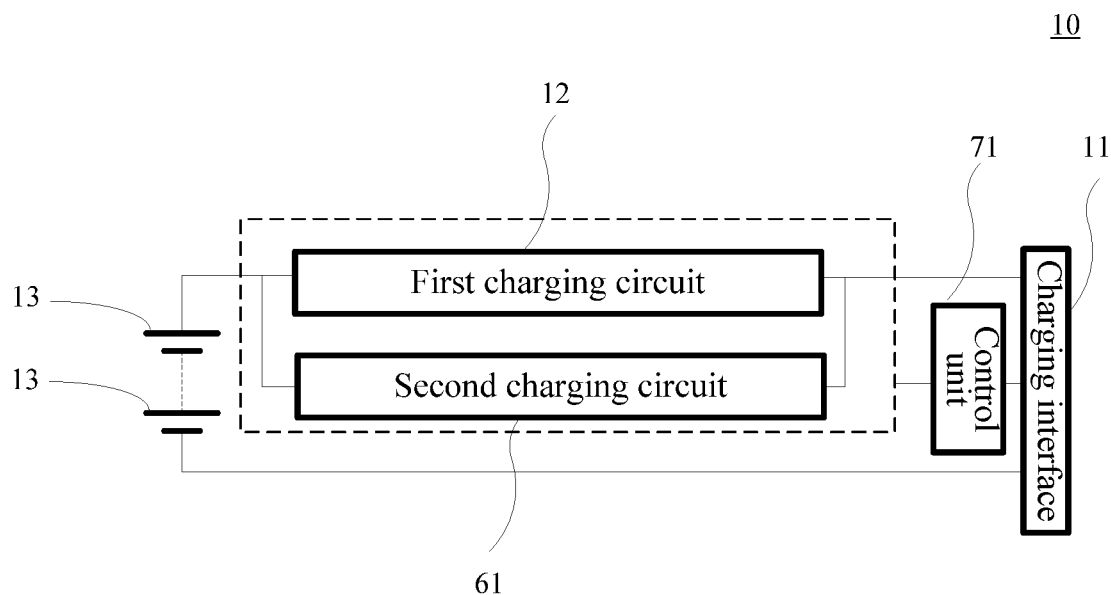
FIG. 8 is a schematic structure diagram illustrating a device to be charged according to still yet another embodiment of the present disclosure.

As illustrated in FIG. 8, the charging interface 11 may include a data wire, and the device to be charged 10 may further include a control unit 71. The control unit 71 may perform a bidirectional communication with the adapter via the data wire so as to control the output of the adapter in the second charging mode. For example, the charging interface is the USB interface, and the data wire may be D+ wire and/or D− wire in the USB interface.

The content communicated between the control unit 71 and the adapter is not limited in embodiments of the present disclosure, and the control method of the control unit 71 in the second charging mode is also not limited in embodiments of the present disclosure. For example, the control unit 71 may communicate with the adapter to obtain the present total voltage or present total electric quantity of the plurality of battery cells 13 in the device to be charged, and adjust the output voltage or output current of the adapter based on the present total voltage or present total electric quantity of the plurality of battery cells 13. In the following, the content communicated between the control unit 71 and the adapter and the control manner of the control unit 71 on the output of the adapter in the second charging mode will be described in detail in combination with specific embodiments.

The master-slave relation of the adapter and the device to be charged (or the control unit 71 in the device to be charged) is not limited in embodiments of the present disclosure. In other words, any of the adapter and the device to be charged can be configured as the master device initiating the bidirectional communication session, accordingly, the other one can be configured as the slave device making a first response or a first reply to the communication initiated by the master device. As a feasible implementation, during the communication, the identifications of the master device and the slave device can be determined by comparing the electrical levels of the adapter and the device to be charged relative to the ground.

The specific implementation of the bidirectional communication between the adapter and the device to be charged is not limited in embodiments of the present disclosure. In other words, any of the adapter and the device to be charged can be configured as the master device initiating the bidirectional communication session, accordingly, the other one can be configured as the slave device making a first response or a first reply to the communication initiated by the master device, and the master device is able to make a second response to the first response or the first reply of the slave device, and thus a negotiation about a charging mode can be realized between the master device and the slave device. As a feasible implementation, a charging operation between the master device and the slave device is performed after a plurality of negotiations about the charging mode are completed between the master device and the slave device, such that the charging process can be performed safely and reliably after the negotiation.

As an implementation, the mater device is able to make a second response to the first response or the first reply made by the slave device with regard to the communication session in a manner that, the master device is able to receive the first response or the first reply made by the slave device to the communication session and to make a targeted second response to the first response or the first reply. As an example, when the master device receives the first response or the first reply made by the slave device to the communication session in a predetermined time period, the master device makes the targeted second response to the first response or the first reply of the slave device in a manner that, the master device and the slave device complete one negotiation about the charging mode, and a charging process may be performed between the master device and the salve device in the first charging mode or the second charging mode according to a negotiation result, i.e., the adapter charges the device to be charged in the first charging mode or the second charging mode according to a negotiation result.

As another implementation, the mater device is able to make a second response to the first response or the first reply made by the slave device to the communication session in a manner that, when the master device does not receive the first response or the first reply made by the slave device to the communication session in the predetermined time period, the mater device also makes the targeted second response to the first response or the first reply of the slave device. As an example, when the master device does not receive the first response or the first reply made by the slave device to the communication session in the predetermined time period, the mater device makes the targeted second response to the first response or the first reply of the slave device in a manner that, the master device and the slave device complete one negotiation about the charging mode, the charging process is performed between the mater device and the slave device in the first charging mode, i.e., the adapter charges the device to be charged in the first charging mode.

In some embodiments, when the device to be charged is configured as the mater device initiating the communication session, after the adapter configured as the slave device makes the first response or the first reply to the communication session initiated by the master device, it is unnecessary for the device to be charged to make the targeted second response to the first response or the first reply of the adapter, i.e., one negotiation about the charging mode is regarded as completed between the adapter and the device to be charged, and the adapter is able to charge the device to be charged in the first charging mode or the second charging mode according to the negotiation result.

In some embodiments, the control unit 71 performs the bidirectional communication with the adapter via the data wire to control the output of the adapter in the second charging mode as follows. The control unit 71 performs the bidirectional communication with the adapter to negotiate the charging mode between the adapter and the device to be charged.

In some embodiments, the control unit 71 performs the bidirectional communication with the adapter to negotiate the charging mode between the adapter and the device to be charged as follows. The control unit 71 receives a first instruction sent by the adapter, in which the first instruction is configured to query the device to be charged whether to operate in the second charging mode. The control unit 71 sends a reply instruction of the first instruction to the adapter, in which the reply instruction of the first instruction is configured to indicate whether the device to be charged agrees to operate in the second charging mode. The control unit 71 controls the adapter to charge the plurality of battery cells via the first charging circuit 12 when the device to be charged agrees to operate in the second charging mode.

In some embodiments, the control unit 71 performs the bidirectional communication with the adapter via the data wire to control the output of the adapter in the second charging mode as follows. The control unit 71 performs the bidirectional communication with the adapter to determine a charging voltage outputted by the adapter in the second charging mode for charging the device to be charged.

In some embodiments, the control unit 71 performs the bidirectional communication with the adapter to determine the charging voltage outputted by the adapter in the second charging mode for charging the device to be charged as follows. The control unit 71 receives a second instruction sent by the adapter, in which the second instruction is configured to query whether the output voltage of the adapter matches with the current total voltage of the plurality of battery cells 13 of the device to be charged. The control unit 71 sends a reply instruction of the second instruction to the adapter, in which the reply instruction of the second instruction is configured to indicate that the output voltage of the adapter matches with the present total voltage of the plurality of battery cells, or is higher or lower than the present total voltage of the plurality of battery cells. In another embodiment, the second instruction can be configured to query whether the present output voltage of the adapter is suitable for being used as the charging voltage outputted by the adapter in the second charging mode for charging the device to be charged, and the reply instruction of the second instruction can be configured to indicate the present output voltage of the adapter is suitable, high or low. When the present output voltage of the adapter is suitable for the present total voltage of the plurality of battery cells or the present output voltage of the adapter is suitable for being used as the charging voltage outputted by the adapter in the second charging mode for charging the device to be charged, it indicates that the present output voltage of the adapter is slightly higher than the present total voltage of the plurality of battery cells, and a difference between the output voltage of the adapter and the present total voltage of the plurality of battery cells is within a predetermined range (typically in an order of hundreds of millivolts).

In some embodiments, the control unit 71 may perform the bidirectional communication with the adapter via the data wire to control the output of the adapter in the second charging mode as follows. The control unit 71 performs the bidirectional communication with the adapter to determine the charging current outputted by the adapter in the second charging mode for charging the device to be charged.

In some embodiments, the control unit 71 performs the bidirectional communication with the adapter to determine the charging current outputted by the adapter in the second charging mode for charging the device to be charged as follows. The control unit 71 receives a third instruction sent by the adapter, in which the third instruction is configured to query the maximum charging current presently supported by the device to be charged. The control unit 71 sends a reply instruction of the third instruction to the adapter, in which the reply instruction of the third instruction is configured to indicate the maximum charging current presently supported by the device to be charged, such that the adapter determines the charging current outputted by the adapter in the second charging mode for charging the device to be charged based on the maximum charging current presently supported by the device to be charged. In an embodiment, the control unit 71 can determine the charging current outputted by the adapter in the second charging mode for charging the device to be charged based on the maximum charging current presently supported by the device to be charged in many ways. For example, the adapter can determine the maximum charging current presently supported by the device to be charged as the charging current outputted by the adapter in the second charging mode for charging the device to be charged, or can determine the charging current outputted by the adapter in the second charging mode for charging the device to be charged after comprehensively considering the maximum charging current presently supported by the device to be charged and its own current output capability.

In some embodiments, the control unit 71 may perform the bidirectional communication with the adapter via the data wire to control the output of the second adapter in the second charging mode as follows. During a charging process using the second charging mode, the control unit 71 performs the bidirectional communication with the adapter to adjust the output current of the adapter.

In some embodiments, the control unit 71 performs the bidirectional communication with the adapter to adjust the output current of the adapter as follows. The control unit 71 receives a fourth instruction sent by the adapter, in which the fourth instruction is configured to query a present total voltage of the plurality of battery cells. The control unit 71 sends a reply instruction of the fourth instruction to the adapter, in which the reply instruction of the fourth instruction is configured to indicate the present total voltage of the plurality of battery cells, such that the adapter adjusts the output current of the adapter according to the present total voltage of the plurality of battery cells.

In some embodiments, the control unit 71 is further configured to receive a fifth instruction sent by the adapter. The fifth instruction is configured to indicate that the charging interface 11 is in poor contact.

Figure 9:
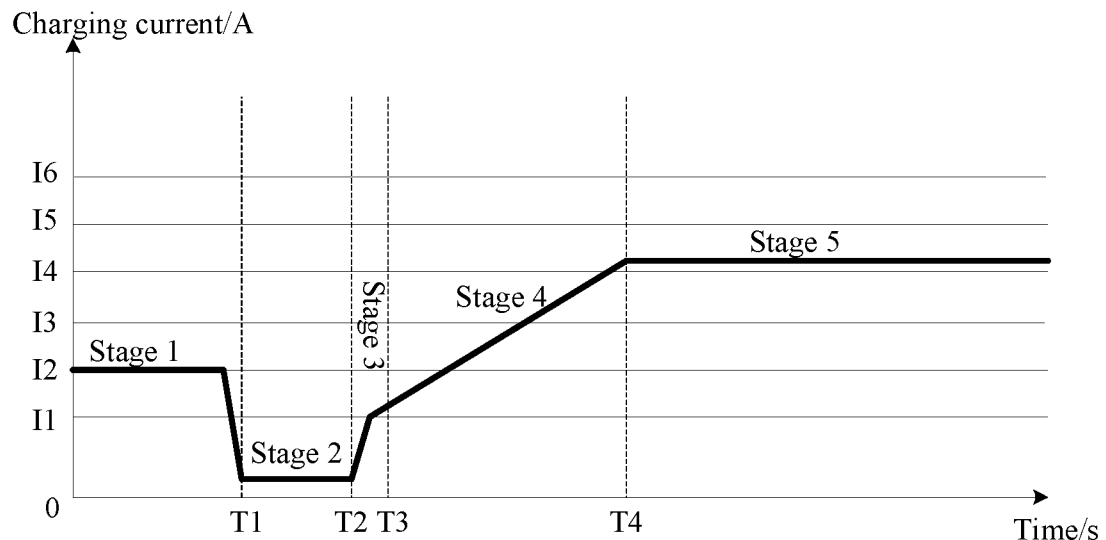
FIG. 9 is a schematic diagram illustrating a charging process according to an embodiment of the present disclosure.

Referring to FIG. 9, the communication procedure between the adapter and the device to be charged (which can be executed by the control unit in the device to be charged) will be described in detail. Examples in FIG. 9 are merely used to help those skilled in the related art to understand the present disclosure. The embodiments shall not be limited to the specific numeric values or specific scenes. Apparently, various modifications and equivalents can be made by those skilled in the related art based on examples in FIG. 9, and those modifications and equivalents shall fall within the protection scope of the present invention.

As illustrated in FIG. 9, the communication procedure between the adapter and the device to be charged (or called as a communication procedure of a quick charging process) may include the following five stages.

Stage 1:

After the device to be charged is coupled with a power supply providing device, the device to be charged may detect a type of the power supply providing device via the data wires D+ and D−. When detecting that the power supply providing device is an adapter, the device to be charged may absorb a current greater than a predetermined current threshold I2, such as 1A. When the adapter detects that a current outputted by the adapter is greater than or equal to I2 within a predetermined time period (such as a continuous time period T1), the adapter determines that the device to be charged has completed the recognition of the type of the power supply providing device. The adapter initiates a negotiation between the adapter and the device to be charged, and sends an instruction 1 (corresponding to the above-mentioned first instruction) to the device to be charged to query whether the device to be charged agrees that the adapter charges the device to be charged in the second charging mode.

When the adapter receives a reply instruction from the device to be charged and the reply instruction indicates that the device to be charged disagrees that the adapter charges the device to be charged in the second charging mode, the adapter detects the output current of the adapter again. When the output current of the adapter is still greater than or equal to I2 within a predetermined continuous time period (such as a continuous time period T1), the adapter sends the instruction 1 again to the device to be charged to query whether device to be charged agrees that the adapter charges the device to be charged in the second charging mode. The adapter repeats the above actions in stage 1, until the device to be charged agrees that the adapter charges the device to be charged in the second charging mode or the output current of the adapter is no longer greater than or equal to I2.

After the device to be charged agrees the adapter to charge the device to be charged in the second charging mode, the communication procedure proceeds to stage 2.

Stage 2:

For the output voltage of the adapter, there may be several levels. The adapter sends an instruction 2 (corresponding to the above-mentioned second instruction) to the device to be charged to query whether the output voltage of the adapter is suitable for the present voltage of the battery (the present total voltage of the plurality of battery cells) in the device to be charged.

The device to be charged sends a reply instruction of the instruction 2 to the adapter, for indicating that the output voltage of the adapter is higher, lower or suitable for the present voltage of the battery in the device to be charged (the present total voltage of the plurality of battery cells). When the reply instruction of the instruction 2 indicates that the output voltage of the adapter is higher, or lower, the adapter adjusts the output voltage of the adapter by one level, and sends the instruction 2 to the device to be charged again to query whether the output voltage of the adapter is suitable for the present voltage of the battery (the present total voltage of the plurality of battery cells). The above actions in stage 2 are repeated, until the device to be charged determines that the output voltage of the adapter is suitable for the present voltage of the battery (the present total voltage of the plurality of battery cells). Then, the communication procedure proceeds to stage 3.

Stage 3:

The adapter sends an instruction 3 (corresponding to the above-mentioned third instruction) to the device to be charged to query the maximum charging current presently supported by the device to be charged. The device to be charged sends a reply instruction of the instruction 3 to the adapter for indicating the maximum charging current presently supported by the device to be charged to the adapter, and then the communication procedure proceeds to stage 4.

Stage 4:

The adapter determines the charging current outputted by the adapter in the second charging mode for charging the device to be charged, according to the maximum charging current presently supported by the device to be charged. Then, the communication procedure proceeds to stage 5, i.e., the constant current charging stage.

Stage 5:

When the communication procedure proceeds to the constant current charging stage, the adapter sends an instruction 4 (corresponding to the above-mentioned fourth instruction) to the device to be charged at intervals to query the present voltage of the battery (the present total voltage of the plurality of battery cells) in the device to be charged. The device to be charged may send a reply instruction of the instruction 4 to the adapter, to feedback the present voltage of the battery (the present total voltage of the plurality of battery cells). The adapter may determine according to the present voltage of the battery (the present total voltage of the plurality of battery cells) whether the charging interface is in poor contact and whether it is necessary to step down the output current of the adapter. When the adapter determines that the charging interface is in poor contact, the adapter sends an instruction 5 (corresponding to the above-mentioned fifth instruction) to the device to be charged, and the adapter quits the second charging mode and then the communication procedure is reset and proceeds to stage 1 again.

In some embodiments of the present disclosure, in stage 1, when the device to be charged sends the reply instruction of the instruction 1, the reply instruction of the instruction 1 may carry data (or information) of the path impedance of the device to be charged. The data of the path impedance of the device to be charged may be used in stage 5 to determine whether the charging interface is in poor contact.

In some embodiments of the present disclosure, in stage 2, the time period from when the device to be charged agrees that the adapter charges the device to be charged in the second charging mode to when the adapter adjusts the output voltage of the adapter to a suitable value may be controlled in a certain range. If the time period exceeds a predetermined range, the adapter or the device to be charged may determine that the communication procedure is abnormal, and is reset and proceeds to stage 1.

In some embodiments, in stage 2, when the output voltage of the adapter is higher than the present voltage of the battery (the present total voltage of the plurality of battery cells) by $\Delta V$ ($\Delta V$ may be set to 200-500 mV), the device to be charged may send a reply instruction of the instruction 2 to the adapter, for indicating that the output voltage of the adapter is suitable for the voltage of the battery (the total voltage of the plurality of battery cells) in the device to be charged.

In some embodiments of the present disclosure, in stage 4, the adjusting speed of the output current of the adapter may be controlled to be in a certain range, thus avoiding an abnormity occurring in the charging process due to a too fast adjusting speed.

In some embodiments of the present disclosure, in stage 5, the variation degree of the output current of the adapter may be controlled to be less than 5%.

In some embodiments of the present disclosure, in stage 5, the adapter can monitor the path impedance of a charging circuit in real time. In detail, the adapter can monitor the path impedance of the charging circuit according to the output voltage of the adapter, the output current of the adapter and the present voltage of the battery (the present total voltage of the plurality of battery cells) fed back by the device to be charged. When the path impedance of the charging circuit is greater than a sum of the path impedance of the device to be charged and the impedance of a charging wire, it may be considered that the charging interface is in poor contact, and thus the adapter stops charging the device to be charged in the second charging mode.

In some embodiments of the present disclosure, after the adapter starts to charge the device to be charged in the second charging mode, time intervals of communication between the adapter and the device to be charged may be controlled to be in a certain range, thus avoiding abnormity in the communication procedure due to a too short time interval of communication.

In some embodiments of the present disclosure, the stop of a charging process (or the stop of the charging process that the adapter charges the device to be charged in the second charging mode) may be a recoverable stop or an unrecoverable stop.

For example, when it is detected that the battery (the plurality of battery cells) in the device to be charged is fully charged or the charging interface is in poor contact, the charging process is stopped and the charging communication procedure is reset, and the charging process proceeds to stage 1 again. When the device to be charged disagrees that the adapter charges the device to be charged in the second charging mode, the communication procedure would not proceed to stage 2. The stop of the charging process in this case may be regarded as an unrecoverable stop.

For another example, when an abnormity occurs in the communication between the adapter and the device to be charged, the charging process is stopped and the charging communication procedure is reset, and the charging process proceeds to stage 1 again. After requirements for stage 1 are met, the device to be charged agrees that the adapter charges the device to be charged in the second charging mode to recover the charging process. In this case, the stop of the charging process may be considered as a recoverable stop.

For another example, when the device to be charged detects that an abnormity occurs in the battery (the plurality of battery cells), the charging process is stopped and reset, and the charging process proceeds to stage 1 again. The device to be charged disagrees that the adapter charges the device to be charged in the second charging mode. When the battery (the plurality of battery cells) returns to normal and the requirements for stage 1 are met, the device to be charged agrees that the adapter charges the device to be charged in the second charging mode. In this case, the termination of quick charging process may be considered as a recoverable termination.

Communication actions or operations illustrated in FIG. 9 are merely exemplary. For example, in stage 1, after the device to be charged is coupled with the adapter, the handshake communication between the device to be charged and the adapter may be initiated by the device to be charged. In other words, the device to be charged sends an instruction 1 to query the adapter whether to operate in the second charging mode. When the device to be charged receives a reply instruction indicating that the adapter agrees to charge the device to be charged in the second charging mode from the adapter, the adapter starts to charge the battery (the plurality of battery cells) in the device to be charged in the second charging mode.

For another example, after stage 5, there may be a constant voltage charging stage. In detail, in stage 5, the device to be charged may feedback the present voltage of the battery (the present total voltage of the plurality of battery cells) to the adapter. The charging process proceeds to the constant voltage charging stage from the constant current charging stage when the present voltage of the battery (the present total voltage of the plurality of battery cells) reaches a voltage threshold for constant voltage charging. During the constant current charging stage, the charging current steps down gradually. When the current reduces to a certain threshold, it indicates that the battery (the plurality of battery cells) in the device to be charged is fully charged, and thus the charging process is stopped.

The device embodiments of the present disclosure are described above in detail with reference to FIGS. 1-9. The method embodiments of the present disclosure will be described below in detail with reference to FIG. 10. The description of the method embodiments corresponds to the description of the device embodiments, which are not elaborated herein for simplicity.

Figure 10:
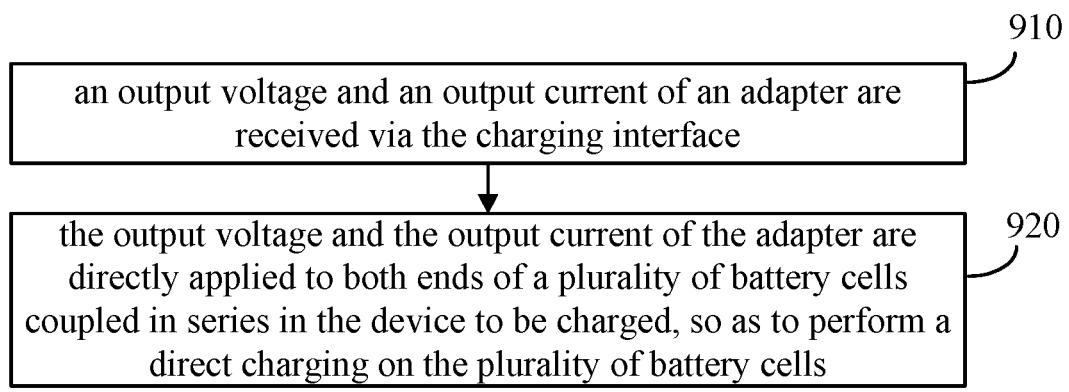
FIG. 10 is a schematic flow chart illustrating a charging method according to an embodiment of the present disclosure.

FIG. 10 is a flow chart of a charging method according to embodiments of the present disclosure. The charging method illustrated in FIG. 10 may be applied for charging the device to be charged. The device to be charged includes a charging interface.

The charging method illustrated in FIG. 10 may include the following.

At block 910, an output voltage and an output current of an adapter are received via the charging interface.

At block 920, the output voltage and the output current of the adapter are directly applied to both ends of a plurality of battery cells coupled in series in the device to be charged, so as to perform a direct charging on the plurality of battery cells.

In some embodiments, the charging method may further include: supplying power to elements in the device to be charged based on a voltage of a single battery cell in the plurality of battery cells, in which the single battery cell may be any one of the plurality of battery cells.

In some embodiments, the charging method may further include: equalizing voltages of respective ones of the plurality of battery cells.

In some embodiments, the plurality of battery cells include a first battery cell and a second battery cell, and equalizing voltages of respective cells of the plurality of battery cells includes: transferring electric quantity between the first battery cell and the second battery cell in an electromagnetic coupling manner.

In some embodiments, transferring electric quantity between the first battery cell and the second battery cell in an electromagnetic coupling manner includes: coupling energy outputted by the first battery cell to a second circuit in an electromagnetic coupling manner through a first circuit,; generating a first charging current according to the energy from the first circuit through the second circuit, and charging the first battery cell and the second battery cell with the first charging current. The first circuit is coupled with the first battery cell, and the second circuit is coupled with the first battery cell and the second battery cell respectively.

In some embodiments, transferring electric quantity between the first battery cell and the second battery cell in an electromagnetic coupling manner as illustrated in FIG. 10 may further includes: coupling energy outputted by the second battery cell to the second circuit in an electromagnetic coupling manner through a third circuit; generating a second charging current according to the energy from the third circuit through the second circuit, and charging the first battery cell and the second battery cell with the second charging current.

In some embodiments, transferring electric quantity between the first battery cell and the second battery cell in an electromagnetic coupling manner as illustrated in FIG. 10 further includes: coupling energy outputted by the first battery cell and the second battery cell to a fifth circuit in an electromagnetic coupling manner through a fourth circuit; generating a second charging current according to the energy from the fourth circuit through the fifth circuit, and charging the first battery cell with the second charging current. The fourth circuit is coupled with the first battery cell and the second battery cell respectively, and the fifth circuit is coupled with the first battery cell.

In some embodiments, the charging method of FIG. 10 may further includes: coupling energy outputted by the first battery cell and the second battery cell to a sixth circuit in an electromagnetic coupling manner through the fourth circuit; generating a third charging current according to the energy from the fourth circuit through the sixth circuit, and charging the second battery cell with the third charging current.

In some embodiments, the charging method of FIG. 10 may further include: step-up the output voltage of the adapter to a second voltage; and applying the second voltage to both ends of the plurality of battery cells so as to charge the plurality of battery cells. The second voltage is greater than a total voltage of the plurality of battery cells.

In some embodiments, the adapter supports a first charging mode and a second charging mode, in which a charging speed of the adapter in the second charging mode is greater than that of the adapter in the first charging mode.

In some embodiments, the charging interface includes a data wire. The charging method of FIG. 10 may further include: performing a bidirectional communication with the adapter via the data wire to control an output of the adapter in the second charging mode.

In some embodiments, performing the bidirectional communication with the adapter via the data wire to control the output of the adapter in the second charging mode includes: performing the bidirectional communication with the adapter to negotiate about a charging mode between the adapter and the device to be charged.

In some embodiments, performing the bidirectional communication with the adapter to negotiate about the charging mode between the adapter and the device to be charged includes: receiving a first instruction sent by the adapter, in which the first instruction is configured to query the device to be charged whether to operate in the second charging mode; sending a reply instruction of the first instruction to the adapter, in which the reply instruction of the first instruction is configured to indicate whether the device to be charged agrees to operate in the second charging mode; and controlling the adapter to charge the plurality of battery cells via the first charging circuit when the device to be charged agrees to operate in the second charging mode.

In some embodiments, performing the bidirectional communication with the adapter via the data wire to control the output of the adapter in the second charging mode may include: performing the bidirectional communication with the adapter to determine a charging voltage outputted by the adapter in the second charging mode for charging the device to be charged.

In some embodiments, performing the bidirectional communication with the adapter to determine the charging voltage outputted by the adapter in the second charging mode for charging the device to be charged may include: receiving a second instruction sent by the adapter, in which the second instruction is configured to query whether the output voltage of the adapter matches with a present total voltage of the plurality of battery cells; and sending a reply instruction of the second instruction to the adapter, in which the reply instruction of the second instruction is configured to indicate that the output voltage of the adapter matches with the present total voltage of the plurality of battery cells, or is higher or lower than the present total voltage of the plurality of battery cells.

In some embodiments, performing the bidirectional communication with the adapter via the data wire to control the output of the adapter in the second charging mode may include: performing the bidirectional communication with the adapter to determine a charging current outputted by the adapter in the second charging mode for charging the device to be charged.

In some embodiments, performing the bidirectional communication with the adapter to determine the charging current outputted by the adapter in the second charging mode for charging the device to be charged may include: receiving a third instruction sent by the adapter, in which the third instruction is configured to query the maximum charging current presently supported by the device to be charged; and sending a reply instruction of the third instruction to the adapter, in which the reply instruction of the third instruction is configured to indicate the maximum charging current presently supported by the device to be charged, such that the adapter determines the charging current outputted by the adapter in the second charging mode for charging the device to be charged according to the maximum charging current presently supported by the device to be charged.

In some embodiments, performing the bidirectional communication with the adapter via the data wire to control the output of the adapter in the second charging mode may include: performing the bidirectional communication with the adapter to adjust the output current of the adapter, during a charging process in the second charging mode.

In some embodiments, performing the bidirectional communication with the adapter to adjust the output current of the adapter may include: receiving a fourth instruction sent by the adapter, in which the fourth instruction is configured to query a present total voltage of the plurality of battery cells; and sending a reply instruction of the fourth instruction to the adapter, in which the reply instruction of the fourth instruction is configured to indicate the present total voltage of the plurality of battery cells, such that the adapter adjusts the output current of the adapter according to the present total voltage of the plurality of battery cells.

Those skilled in the art may be aware that, in combination with the examples described in the embodiments disclosed in this specification, units and algorithm steps can be implemented by electronic hardware, or a combination of computer software and electronic hardware. In order to clearly illustrate interchangeability of the hardware and software, components and steps of each example are already described in the description according to the function commonalities. Whether the functions are executed by hardware or software depends on particular applications and design constraint conditions of the technical solutions. Persons skilled in the art may use different methods to implement the described functions for each particular application, but it should not be considered that the implementation goes beyond the scope of the present invention.

Those skilled in the art may be aware that, with respect to the working process of the system, the device and the unit, reference is made to the part of description of the method embodiment for simple and convenience, which are described herein.

In embodiments of the present disclosure, it should be understood that, the disclosed system, device and method may be implemented in other way. For example, embodiments of the described device are merely exemplary. The partition of units is merely a logical function partitioning. There may be other partitioning ways in practice. For example, several units or components may be integrated into another system, or some features may be ignored or not implemented. Further, the coupling between each other or directly coupling or communication connection may be implemented via some interfaces. The indirect coupling or communication connection may be implemented in electrical, mechanical or other manners.

In embodiments of the present disclosure, it should be understood that, the units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, each functional unit in the present disclosure may be integrated in one progressing module, or each functional unit exists as an independent unit, or two or more functional units may be integrated in one module.

If the integrated module is embodied in software and sold or used as an independent product, it can be stored in the computer readable storage medium. Based on this, the technical solution of the present disclosure or a part making a contribution to the related art or a part of the technical solution may be embodied in a manner of software product. The computer software produce is stored in a storage medium, including some instructions for causing one computer device (such as a personal PC, a server, or a network device etc.) to execute all or some of steps of the method according to embodiments of the present disclosure. The above-mentioned storage medium may be a medium able to store program codes, such as, USB flash disk, mobile hard disk drive (mobile HDD), read-only memory (ROM), random-access memory (RAM), a magnetic tape, a floppy disc, an optical data storage device, and the like.

What is claimed is:

1. A device to be charged, comprising:
a charging interface;
a first charging circuit, coupled with the charging interface, configured to receive an output voltage and an output current of an adapter via the charging interface and to apply the output voltage and the output current of the adapter to both ends of a plurality of battery cells coupled in series in the device to be charged, so as to charge the plurality of battery cells; and
a second charging circuit, comprising a step-up circuit, the step-up circuit having both ends coupled with the charging interface and the plurality of battery cells and configured to receive the output voltage of the adapter via the charging interface, to step up the output voltage of the adapter to a second voltage and to apply the second voltage to the both ends of the plurality of battery cells so as to charge the plurality of battery cells, wherein the output voltage of the adapter received by the second charging circuit is less than a total voltage of the plurality of battery cells, and the second voltage is greater than the total voltage of the plurality of battery cells,
wherein the adapter supports a first charging mode and a second charging mode, a charging speed of the adapter in the second charging mode is greater than that of the adapter in the first charging mode, the adapter charges the plurality of battery cells via the second charging circuit in the first charging mode, and charges the plurality of battery cells via the first charging circuit in the second charging mode.

2. The device to be charged according to claim 1, further comprising:
an equalization circuit, coupled with the plurality of battery cells, and configured to equalize voltages of respective battery cells of the plurality of battery cells.

3. The device to be charged according to claim 2, wherein the plurality of battery cells comprise a first battery cell and a second battery cell, and the equalization circuit is configured to transfer electric quantity between the first battery cell and the second battery cell in an electromagnetic coupling manner.

4. The device to be charged according to claim 3, wherein the equalization circuit comprises a first circuit and a second circuit, the first circuit is coupled with the first battery cell, and the second circuit is coupled with the first battery cell and the second battery cell respectively;
wherein when the first circuit is switched on, the first circuit is configured to couple energy outputted by the first battery cell to the second circuit in an electromagnetic coupling manner, such that the second circuit generates a first charging current based on the energy from the first circuit, and charges the first battery cell and the second battery cell with the first charging current.

5. The device to be charged according to claim 4, wherein the equalization circuit further comprises a third circuit, and the third circuit is coupled with the second battery cell;
wherein when the third circuit is switched on, the third circuit is configured to couple energy outputted by the second battery cell to the second circuit in an electromagnetic coupling manner, such that the second circuit generates a second charging current based on the energy from the third circuit, and charges the first battery cell and the second battery cell with the second charging current.

6. The device to be charged according to claim 3, wherein the equalization circuit comprises one circuit and another circuit, the one circuit is coupled with the first battery cell and the second battery cell respectively, and the another circuit is coupled with the first battery cell;
wherein when both the one circuit and the another circuit are switched on, the one circuit is configured to couple energy outputted by the first battery cell and the second battery cell to the another circuit in an electromagnetic coupling manner, such that the another circuit generates a second charging current based on the energy from the one circuit, and charges the first battery cell with the second charging current.

7. The device to be charged according to claim 6, wherein the equalization circuit further comprises a still another circuit, and the still another circuit is coupled with the second battery cell;
wherein when both the one circuit and the still another circuit are switched on, the one circuit is configured to couple energy outputted by the first battery cell and the second battery cell to the still another circuit in an electromagnetic coupling manner, such that the still another circuit generates a third charging current based on the energy from the one circuit, and charges the second battery cell with the third charging current.

8. The device to be charged according to claim 1, further comprising:
a power supply circuit, having an input end coupled with both ends of an arbitrary battery cell in the plurality of battery cells, and configured to supply power for elements in the device to be charged based on a voltage of the arbitrary battery cell.

9. The device to be charged according to claim 1, wherein the output current outputted by the adapter and received by the first charging circuit is a pulsating direct current, an alternating current or a constant direct current.

10. The device to be charged according to claim 1, wherein the output voltage outputted by the adapter and received by the first charging circuit via the charging interface is a voltage outputted by the adapter in a constant current mode, and the output current outputted by the adapter and received by the first charging circuit via the charging interface is a current outputted by the adapter in the constant current mode.

11. The device to be charged according to claim 1, wherein the output voltage of the adapter received by the second charging circuit is 5V.

12. The device to be charged according to claim 1, wherein the charging interface comprises a data wire, the device to be charged further comprises a control unit, and the control unit is configured to perform a bidirectional communication with the adapter via the data wire to control an output of the adapter in the second charging mode.

13. The device to be charged according to claim 12, wherein when the control unit performs the bidirectional communication with the adapter via the data wire to control the output of the adapter in the second charging mode,
the control unit is configured to perform the bidirectional communication with the adapter to negotiate about a charging mode between the adapter and the device to be charged.

14. The device to be charged according to claim 13, wherein when the control unit performs the bidirectional communication with the adapter to negotiate about the charging mode between the adapter and the device to be charged, the control unit is configured to:
receive a first instruction sent by the adapter, in which the first instruction is configured to query the device to be charged whether to operate in the second charging mode;
send a reply instruction of the first instruction to the adapter, in which the reply instruction of the first instruction is configured to indicate whether the device to be charged agrees to operate in the second charging mode;
control the adapter to charge the plurality of battery cells via the first charging circuit when the device to be charged agrees to operate in the second charging mode.

15. The device to be charged according to claim 12, wherein when the control unit performs the bidirectional communication with the adapter via the data wire to control the output of the adapter in the second charging mode,
the control unit is configured to perform the bidirectional communication with the adapter to determine a charging voltage outputted by the adapter in the second charging mode for charging the device to be charged.

16. The device to be charged according to claim 15, wherein when the control unit performs the bidirectional communication with the adapter to determine the charging voltage outputted by the adapter in the second charging mode for charging the device to be charged, the control unit is configured to:
receive a second instruction sent by the adapter, in which the second instruction is configured to query whether the output voltage of the adapter matches with a present total voltage of the plurality of battery cells;
send a reply instruction of the second instruction to the adapter, in which the reply instruction of the second instruction is configured to indicate that the output voltage of the adapter matches with the present total voltage of the plurality of battery cells, or is higher or lower than the present total voltage of the plurality of battery cells.

17. The device to be charged according to claim 12, wherein when the control unit performs the bidirectional communication with the adapter via the data wire to control the output of the adapter in the second charging mode,
the control unit is configured to perform the bidirectional communication with the adapter to determine a charging current outputted by the adapter in the second charging mode for charging the device to be charged;
wherein when the control unit performs the bidirectional communication with the adapter to determine the charging current outputted by the adapter in the second charging mode for charging the device to be charged, the control unit is configured to:
receive a third instruction sent by the adapter, in which the third instruction is configured to query a maximum charging current presently supported by the device to be charged;
send a reply instruction of the third instruction to the adapter, in which the reply instruction of the third instruction is configured to indicate the maximum charging current presently supported by the device to be charged, such that the adapter determines the charging current outputted by the adapter in the second charging mode for charging the device to be charged according to the maximum charging current presently supported by the device to be charged.

18. The device to be charged according to claim 12, wherein when the control unit performs the bidirectional communication with the adapter via the data wire to control the output of the adapter in the second charging mode,
the control unit is configured to perform the bidirectional communication with the adapter to adjust the output current of the adapter, during a charging process in the second charging mode;
wherein when the control unit performs the bidirectional communication with the adapter to adjust the output current of the adapter, the control unit is configured to:
receive a fourth instruction sent by the adapter, in which the fourth instruction is configured to query a present total voltage of the plurality of battery cells;
send a reply instruction of the fourth instruction to the adapter, in which the reply instruction of the fourth instruction is configured to indicate the present total voltage of the plurality of battery cells, such that the adapter adjusts the output current of the adapter according to the present total voltage of the plurality of battery cells.

19. A charging method, applied for charging a device to be charged, wherein the device to be charged comprises a charging interface, and the charging method comprises:
receiving an output voltage and an output current of an adapter via the charging interface;
applying the output voltage and the output current of the adapter to both ends of a plurality of battery cells coupled in series in the device to be charged, so as to charge the plurality of battery cells;
stepping up the output voltage of the adapter to a second voltage; and applying the second voltage to the both ends of the plurality of battery cells so as to charge the plurality of battery cells, wherein the output voltage of the adapter is less than a total voltage of the plurality of battery cells, and the second voltage is greater than the total voltage of the plurality of battery cells, wherein the adapter supports a first charging mode and a second charging mode, a charging speed of the adapter in the second charging mode is greater than that of the adapter in the first charging mode, the adapter charges the plurality of battery cells via the second charging circuit in the first charging mode, and charges the plurality of battery cells via the first charging circuit in the second charging mode.

* * * * *